(12) United States Patent
Hara et al.

(10) Patent No.: US 10,838,186 B2
(45) Date of Patent: Nov. 17, 2020

(54) INFORMATION ACQUISITION APPARATUS

(71) Applicant: OLYMPUS CORPORATION, Hachioji (JP)

(72) Inventors: Kento Hara, Kokubunji (JP); Tadashi Hirata, Hachioji (JP); Yasuharu Yamada, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 158 days.

(21) Appl. No.: 16/259,482

(22) Filed: Jan. 28, 2019

(65) Prior Publication Data

US 2019/0243115 A1 Aug. 8, 2019

(30) Foreign Application Priority Data

Feb. 8, 2018 (JP) ................. 2018-021379

(51) Int. Cl.
| | | |
|---|---|---|
| G02B 21/00 | (2006.01) | |
| G02B 21/14 | (2006.01) | |
| G02B 27/30 | (2006.01) | |
| F21V 8/00 | (2006.01) | |
| G02B 13/18 | (2006.01) | |

(52) U.S. Cl.
CPC ............. G02B 21/14 (2013.01); G02B 6/002 (2013.01); G02B 13/18 (2013.01); G02B 27/30 (2013.01)

(58) Field of Classification Search
CPC ........ G02B 21/14; G02B 27/30; G02B 6/002; G02B 13/18; G02B 21/02; G02B 13/0045; G02B 21/06; G02B 21/361; G02B 21/0088; G02B 21/084; G02B 21/086; G02B 21/24; G02B 27/646; G02B 15/14; G02B 15/177; G02B 1/041; G02B 5/005; G02B 3/00; G02B 9/14; G02B 15/145129; G02B 15/144111
See application file for complete search history.

(56) References Cited

U.S. PATENT DOCUMENTS

| | | | |
|---|---|---|---|
| 5,751,475 A | 5/1998 | Ishiwata et al. | |
| 10,162,163 B2* | 12/2018 | Uchida | ................. G02B 13/02 |
| 2017/0261732 A1 | 9/2017 | Takahashi et al. | |
| 2019/0265450 A1* | 8/2019 | Maetaki | ................. G02B 15/20 |

FOREIGN PATENT DOCUMENTS

| | | |
|---|---|---|
| JP | H07261089 A | 10/1995 |
| WO | 2016158780 A1 | 10/2016 |

* cited by examiner

*Primary Examiner* — Mustak Choudhury
(74) *Attorney, Agent, or Firm* — Holtz, Holtz & Volek PC

(57) ABSTRACT

An information acquisition apparatus includes an illuminating section, an image forming optical system, and an image pickup element. The image forming optical system includes an incidence-side lens unit having a positive refractive power, an aperture section, and an emergence-side lens unit having a positive refractive power. The incidence-side lens unit and the emergence-side lens unit include a plurality of positive lenses and at least one negative lens, and the following conditional expressions (1) to (9) are satisfied:

$-6 < \beta d < -0.8$ (1)

$-0.5 < TL/|ENPL| < 3.0$ (2)

$-1.5 < TL/|EXPL| < 0.5$ (3)

$0.001 < |\Delta Cd|/Sim^{1/2} < 0.05$ (4)

$0.04 < |\Delta dF|/Sim^{1/2} < 0.28$ (5)

$3.5 < |\Delta CF|/|\Delta Cd| < 38.0$ (6)

$0 < |\Delta SAd|/|\Delta CF| < 0.27$ (7)

$0 < |\Delta SAC|/|\Delta CF| < 0.16$ (8)

$0 < |\Delta SAF|/|\Delta CF| < 1.1$ (9).

10 Claims, 16 Drawing Sheets

FIG. 4A
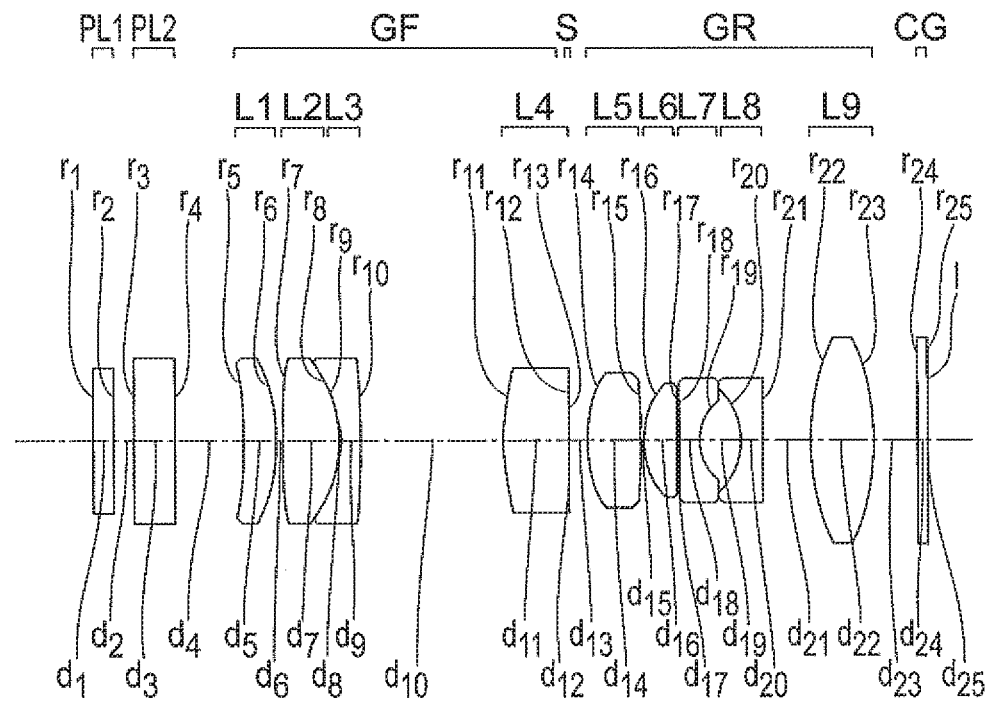
FIG. 4B
SA
NA 0.249
FIG. 4C
AS
IH 3.92
FIG. 4D
DT
IH 3.92
FIG. 4E
CC
IH 3.92
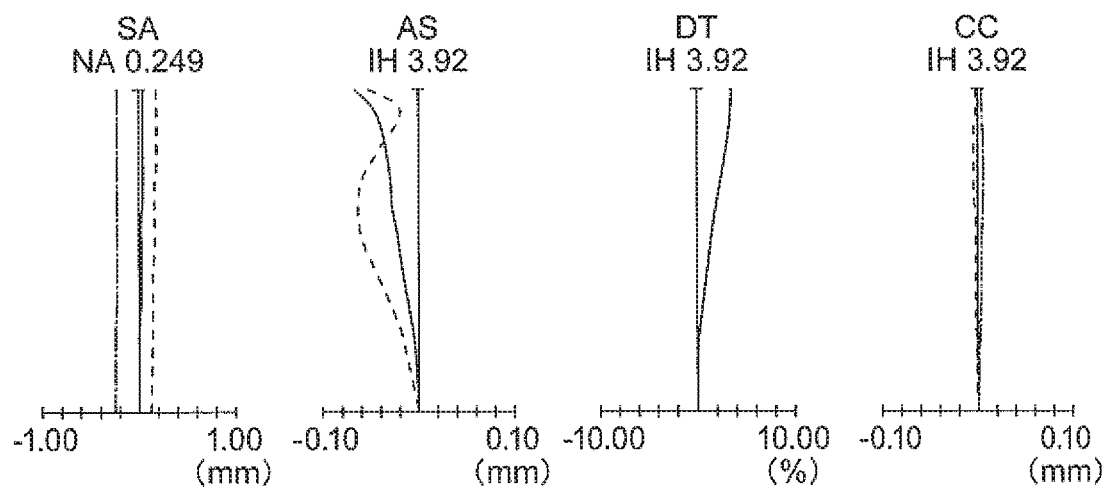

FIG. 6A
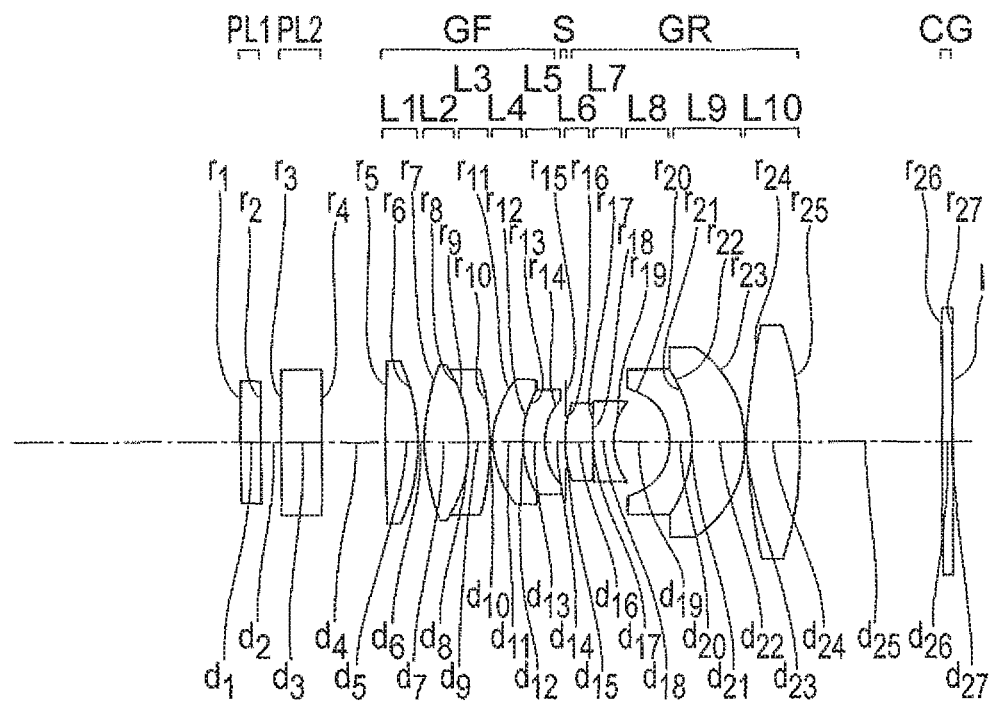
FIG. 6B
SA
NA 0.250
FIG. 6C
AS
IH 3.92
FIG. 6D
DT
IH 3.92
FIG. 6E
CC
IH 3.92
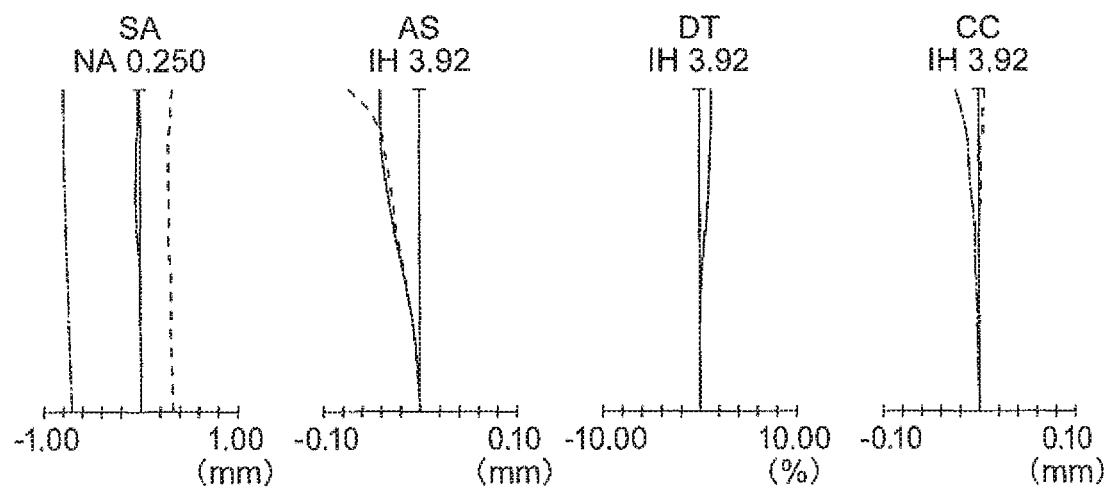

SA        AS        DT        CC
NA 0.250  IH 3.92   IH 3.92   IH 3.92

SA NA 0.251  
AS IH 4.46  
DT IH 4.46  
CC IH 4.46

SA        AS        DT        CC
NA 0.250  IH 3.92   IH 3.92   IH 3.92

INFORMATION ACQUISITION APPARATUS

CROSS-REFERENCE TO RELATED APPLICATION

The present application is based upon and claims the benefit of priority from the prior Japanese Patent Application No. 2018-021379 filed on Feb. 8, 2018; the entire contents of which are incorporated herein by reference.

BACKGROUND OF THE INVENTION

Field of the Invention

The present invention relates to an information acquisition apparatus which acquires information of an object by using an optical image of the object.

Description of the Related Art

As an information acquisition apparatus, an information acquisition apparatus disclosed in Japanese Patent Application Laid-open Publication No. Hei 7-261089 and an information acquisition apparatus disclosed in International Unexamined Patent Application Publication No. 2016/158780 have been known. In these information acquisition apparatuses, a cell is let to be an object.

In Japanese Patent Application Laid-open Publication No. Hei 7-261089, an information acquisition apparatus in which a phase-contrast microscopy and a differential interference contrast microscopy are used has been disclosed. Moreover, in International Unexamined Patent Application Publication No. 2016/158780, an information acquisition apparatus in which an oblique illumination is used has been disclosed. In these information acquisition apparatuses, it is possible to observe an object with a favorable contrast.

SUMMARY OF THE INVENTION

An information acquisition apparatus according to at least some embodiments of the present invention comprises:
an illuminating section,
an image forming optical system, and
an image pickup element, wherein
the illuminating section includes a light source and an illuminating optical system, and
an image pickup surface of the image pickup element is positioned on an image plane of the image forming optical system, and
the image forming optical system includes in order from an object side, an incidence-side lens unit having a positive refractive power, an aperture section, and an emergence-side lens unit having a positive refractive power, and
an entrance pupil and an exit pupil are formed by the incidence-side lens unit, the aperture section, and the emergence-side lens unit, and
the incidence-side lens unit includes a plurality of positive lenses and at least one negative lens, and
the emergence-side lens unit includes a plurality of positive lenses and at least one negative lens, and
the following conditional expressions (1) to (9) are satisfied:

$$-6 < \beta d < -0.8 \quad (1)$$

$$-0.5 < TL/|ENPL| < 3.0 \quad (2)$$

$$-1.5 < TL/|EXPL| < 0.5 \quad (3)$$

$$0.001 < |\Delta Cd|/Sim^{1/2} < 0.05 \quad (4)$$

$$0.04 < |\Delta dF|/Sim^{1/2} < 0.28 \quad (5)$$

$$3.5 < |\Delta CF|/|\Delta Cd| < 38.0 \quad (6)$$

$$0 < |\Delta SAd|/|\Delta CF| < 0.27 \quad (7)$$

$$0 < |\Delta SAC|/|\Delta CF| < 0.16 \quad (8)$$

$$0 < |\Delta SAF|/|\Delta CF| < 1.1 \quad (9)$$

where,
βd denotes a lateral magnification of the image forming optical system for a d-line,
TL denotes a distance between an optical surface positioned nearest to an object of the image forming optical system and the image plane,
ENPL denotes a distance from a lens surface positioned nearest to the object of the image forming optical system up to the entrance pupil,
EXPL denotes a distance from a lens surface positioned nearest to an image of the image forming optical system up to the exit pupil,
ΔCd denotes a difference between an image forming position for the d-line and an image forming position for a C-line,
ΔdF denotes a difference between the image forming position for the d-line and an image forming position for an F-line,
ΔCF denotes a difference between the image forming position for the C-line and the image forming position for the F-line,
Sim denotes an area of an effective image pickup area on the image pickup surface,
ΔSAd denotes the maximum amount of a spherical aberration for the d-line,
ΔSAC denotes the maximum amount of a spherical aberration for the C-line, and
ΔSAF denotes the maximum amount of a spherical aberration for the F-line, and here
the distance is a distance for the d-line,
the image forming position is an image position by a paraxial light ray, and
the distance and the difference are a distance on the optical axis and a difference on the optical axis, respectively.

BRIEF DESCRIPTION OF THE DRAWINGS

FIG. 4A is a lens cross-sectional view of an image forming optical system of an example 4, and FIG. 4B, FIG. 4C, FIG. 4D, and FIG. 4E are aberration diagrams of the image forming optical system of the example 4;

FIG. 6A is a lens cross-sectional view of an image forming optical system of an example 6, and FIG. 6B, FIG. 6C, FIG. 6D, and FIG. 6E are aberration diagrams of the image forming optical system of the example 6;

DETAILED DESCRIPTION OF THE INVENTION

Figure 1A:
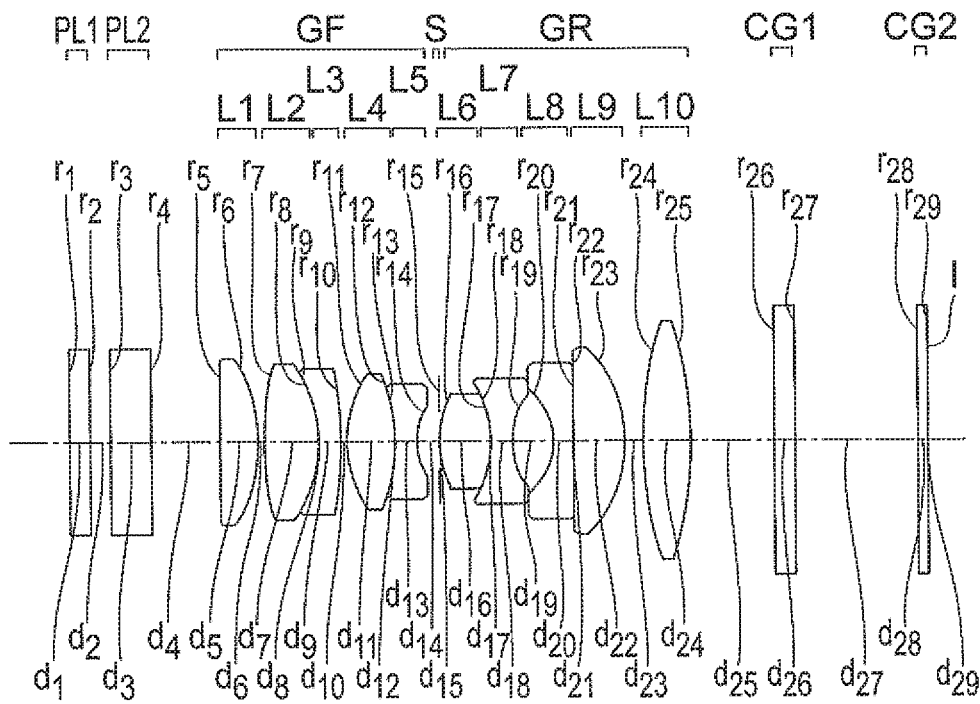
FIG. 1A is a lens cross-sectional view of an image forming optical system of an example 1.
Figures 1B, 1C, 1D, 1E:
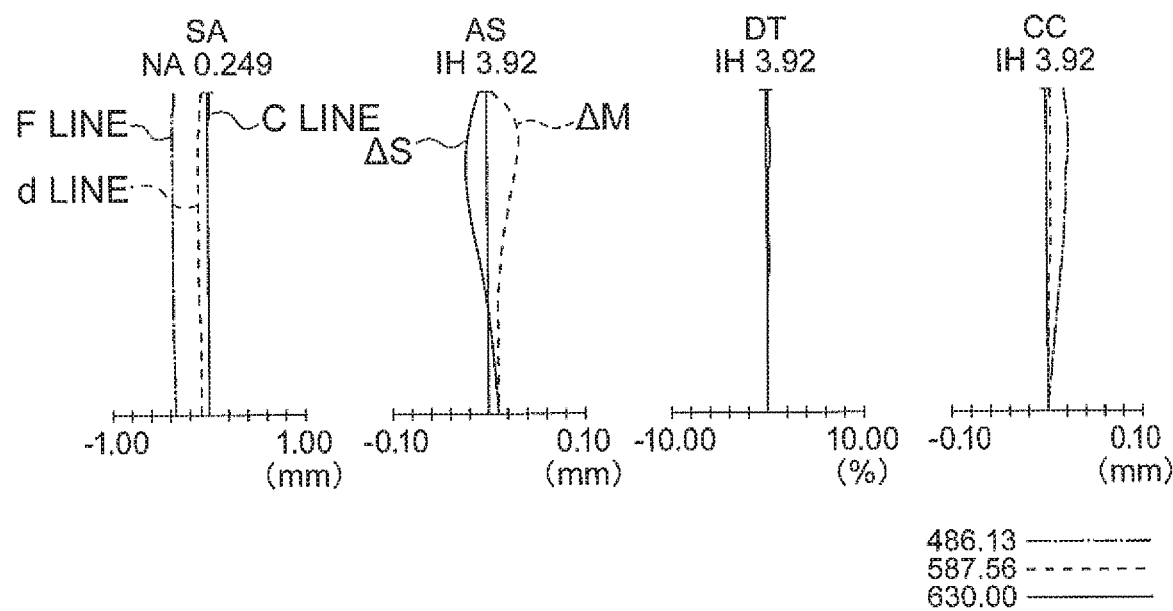
FIG. 1B, FIG. 1C, FIG. 1D, and FIG. 1E are aberration diagrams of the image forming optical system of the example 1.
Figure 2A:
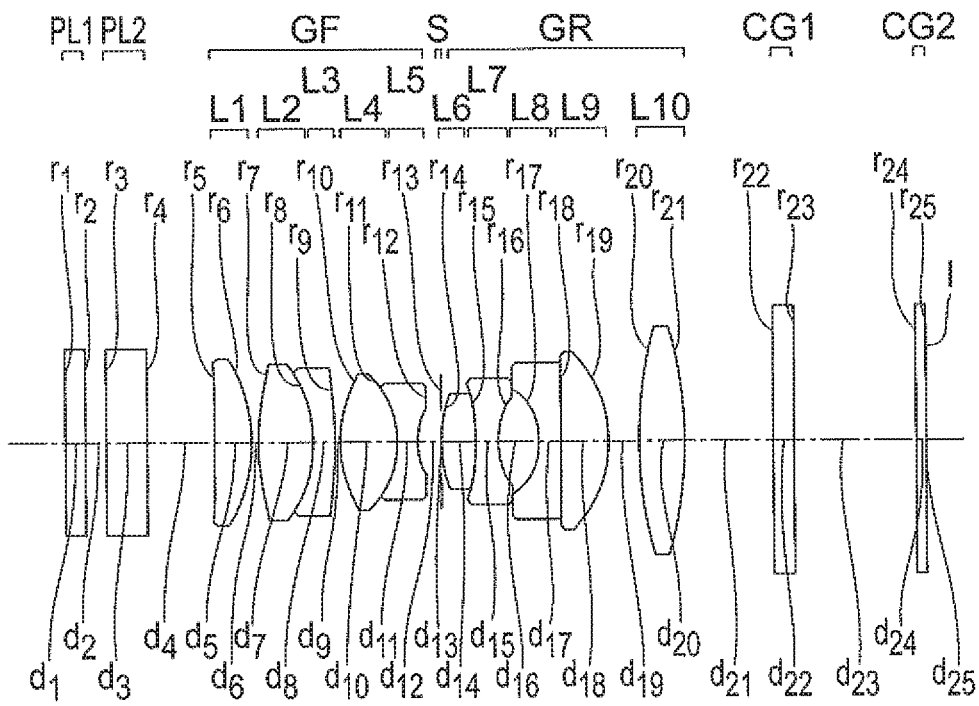
FIG. 2A is a lens cross-sectional view of an image forming optical system of an example 2.
Figures 2B, 2C, 2D, 2E:
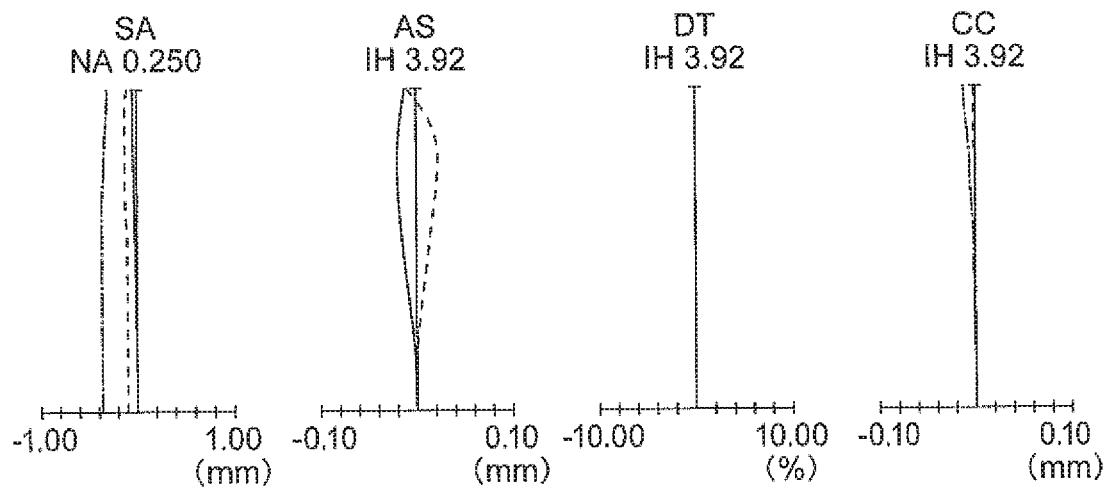
FIG. 2B, FIG. 2C, FIG. 2D, and FIG. 2E are aberration diagrams of the image forming optical system of the example 2.
Figure 3A:
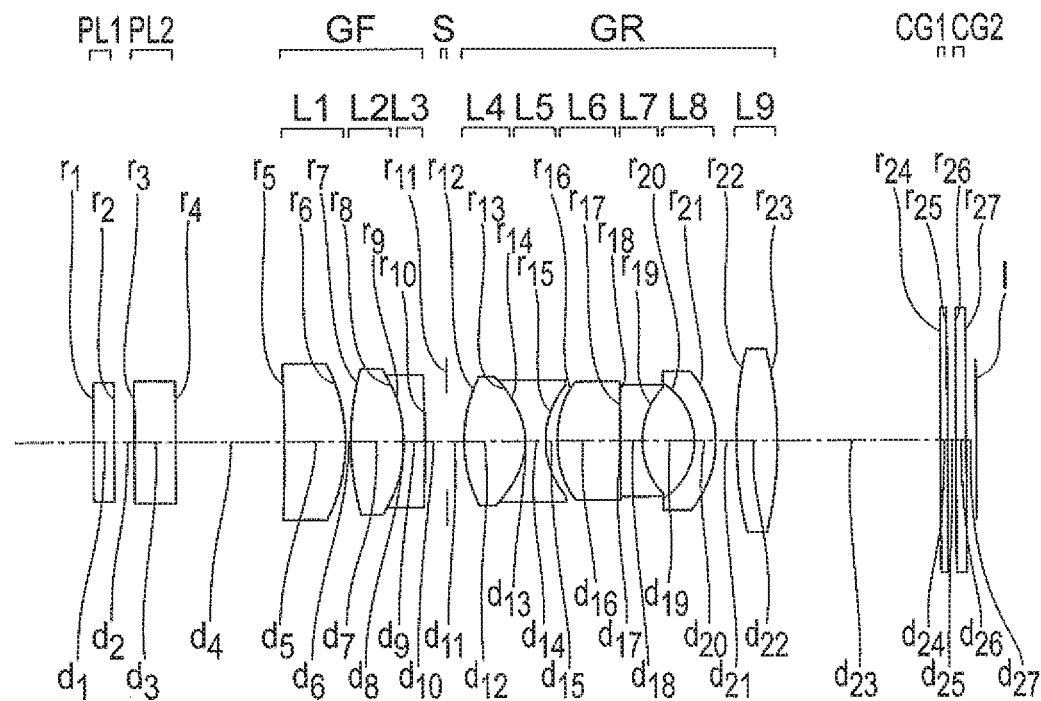
FIG. 3A is a lens cross-sectional view of an image forming optical system of an example 3.
Figures 3B, 3C, 3D, 3E:
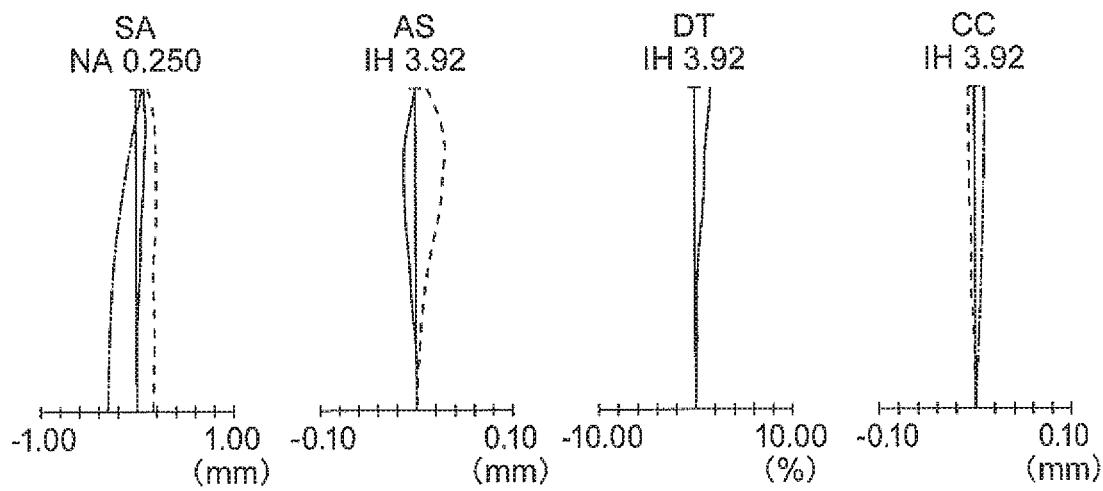
FIG. 3B, FIG. 3C, FIG. 3D, and FIG. 3E are aberration diagrams of the image forming optical system of the example 3.
Figure 5A:
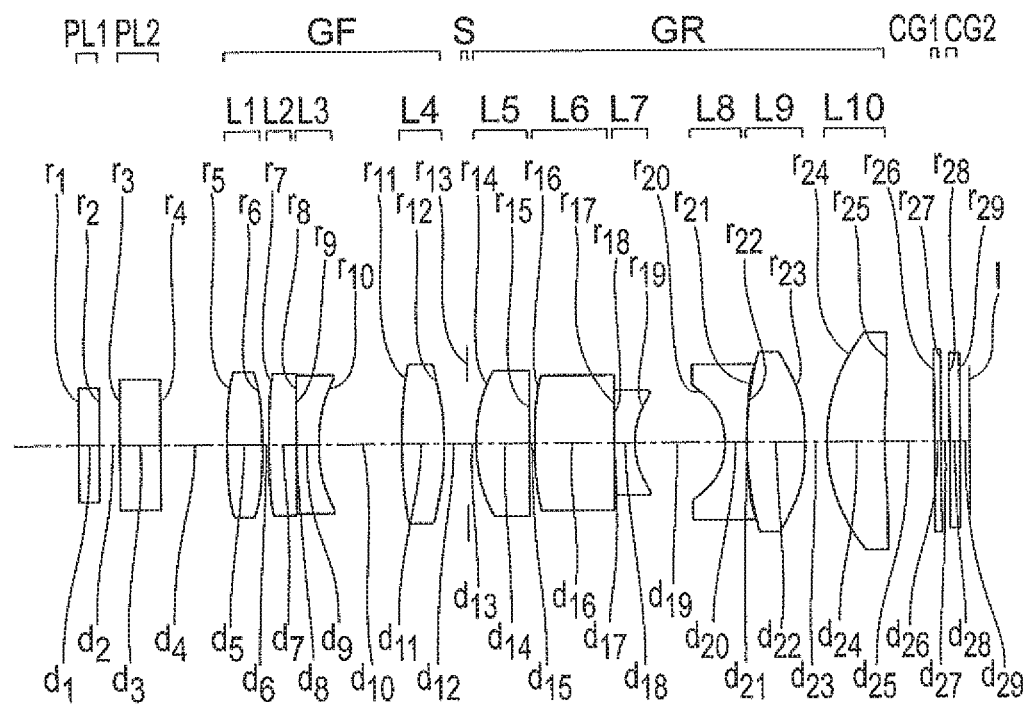
FIG. 5A is a lens cross-sectional view of an image forming optical system of an example 5, and FIG. 5B, FIG.
Figures 5B, 5C, 5D, 5E:
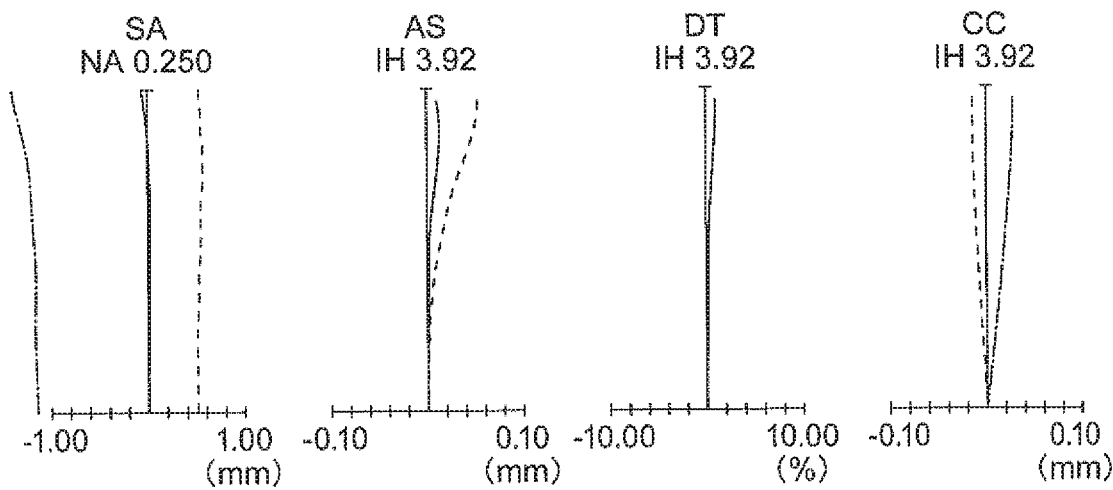
FIG. 5D, and FIG. 5E are aberration diagrams of the image forming optical system of the example 5.
Figure 7A:
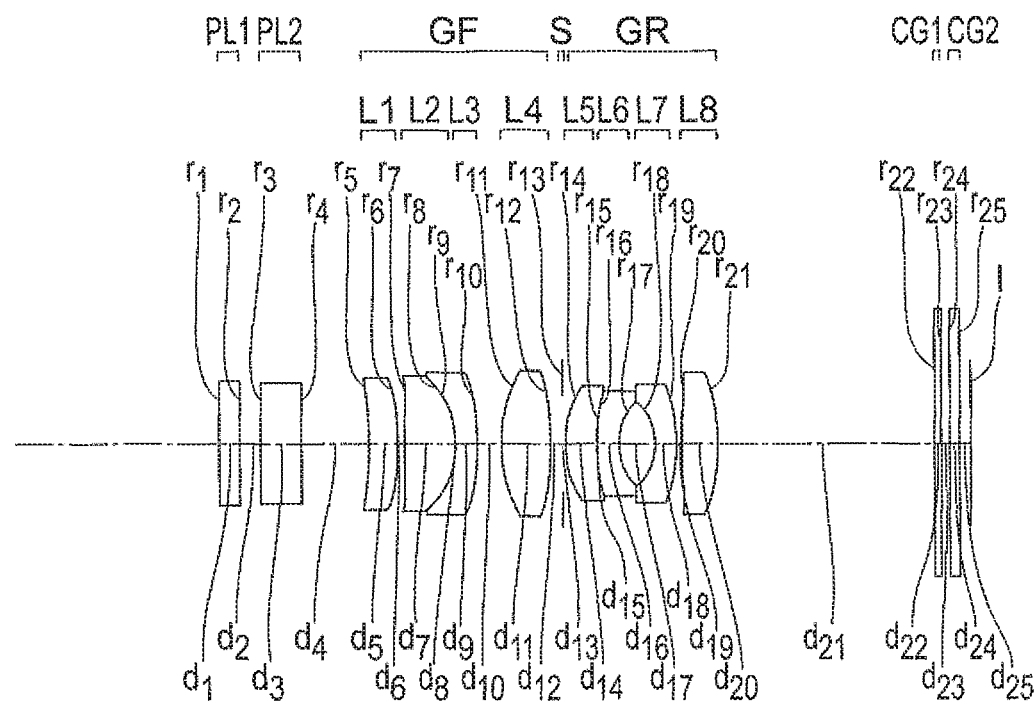
FIG. 7A is a lens cross-sectional view of an image forming optical system of an example 7.
Figures 7B, 7C, 7D, 7E:
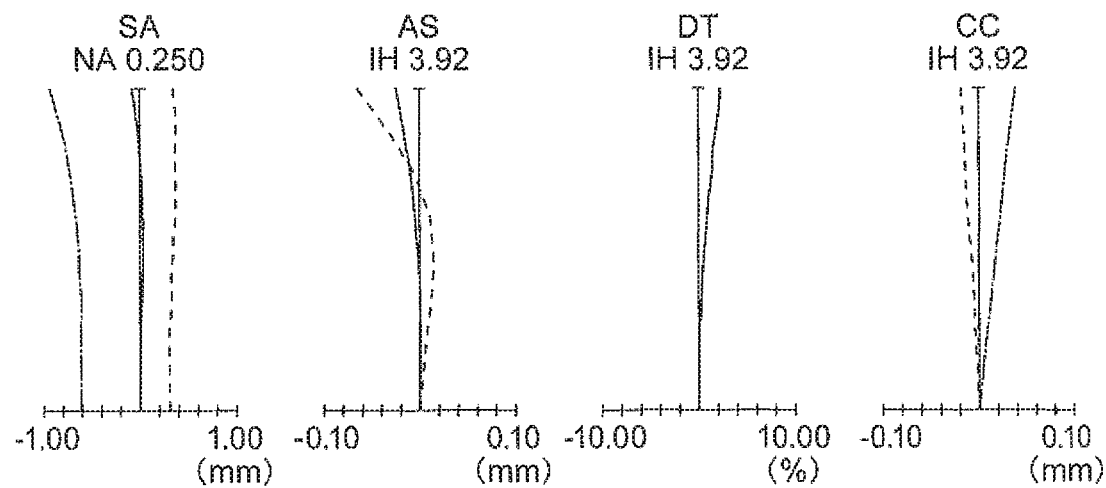
FIG. 7B, FIG. 7C, FIG. 7D, and FIG. 7E are aberration diagrams of the image forming optical system of the example 7.
Figure 8A:
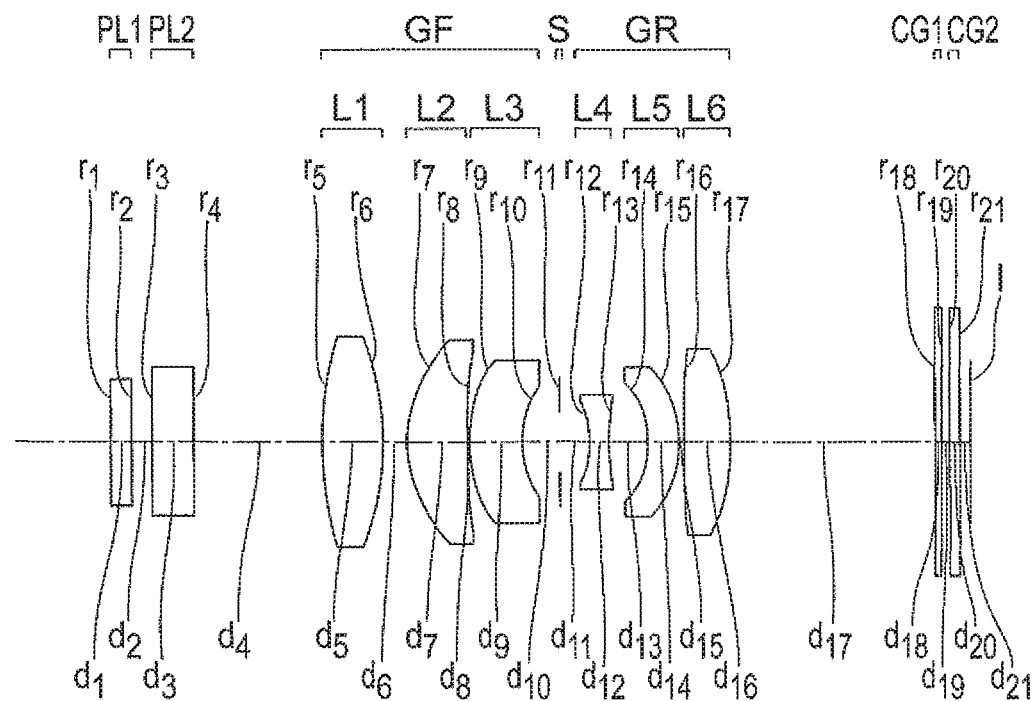
FIG. 8A is a lens cross-sectional view of an image forming optical system of an example 8.
Figures 8B, 8C, 8D, 8E:
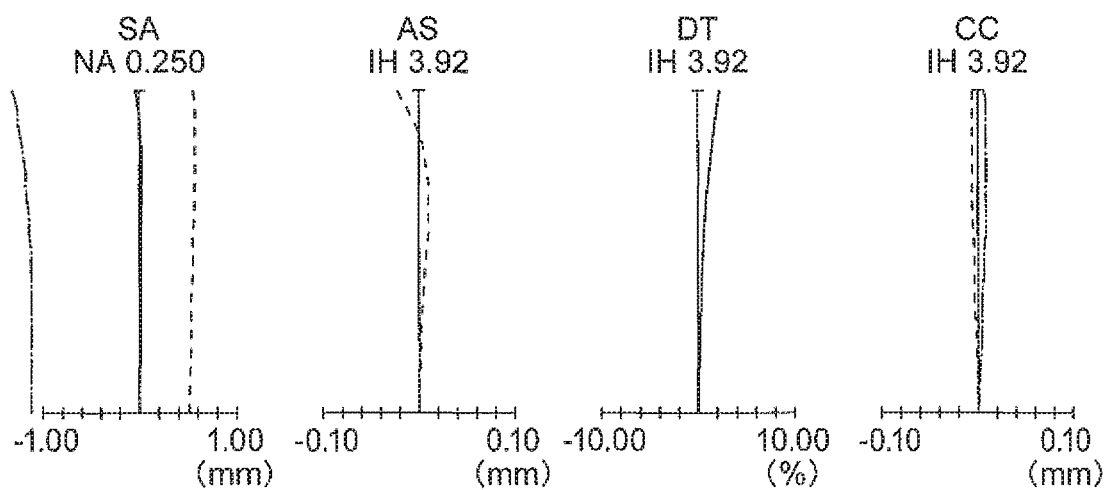
FIG. 8B, FIG. 8C, FIG. 8D, and FIG. 8E are aberration diagrams of the image forming optical system of the example 8.
Figure 9A:
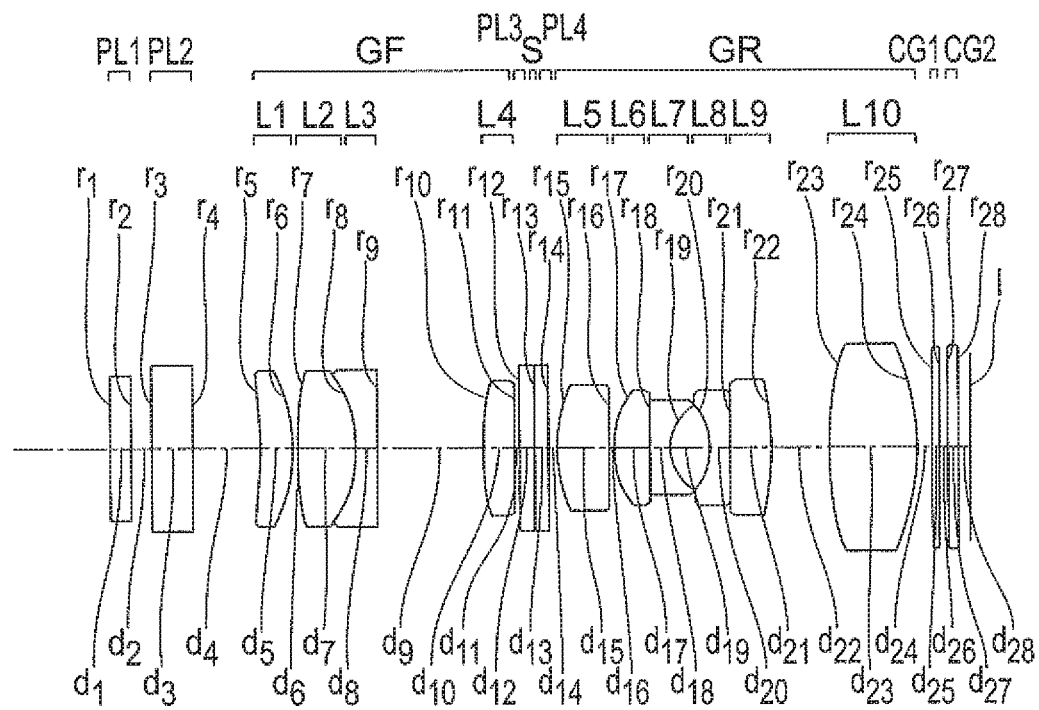
FIG. 9A is a lens cross-sectional view of an image forming optical system of an example 9.
Figures 9B, 9C, 9D, 9E:
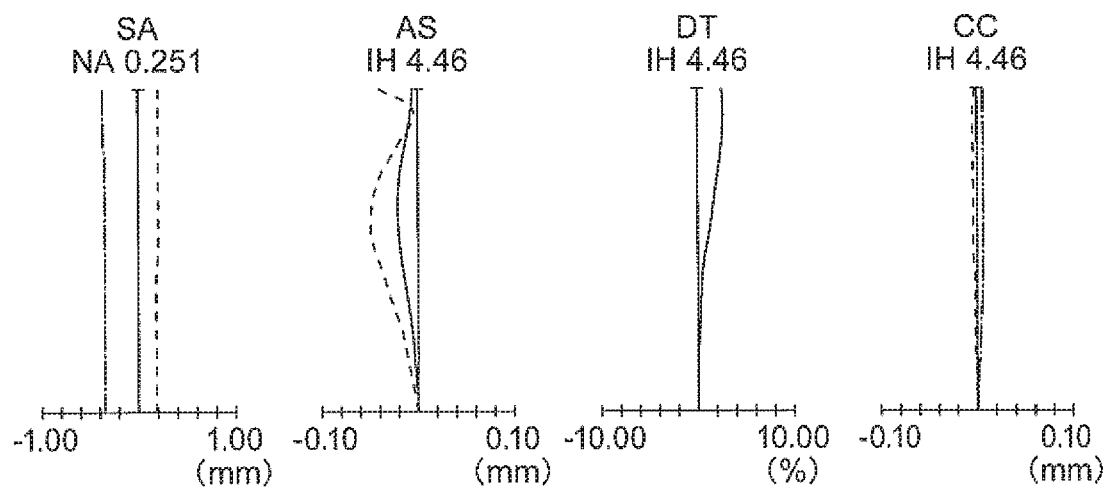
FIG. 9B, FIG. 9C, FIG. 9D, and FIG. 9E are aberration diagrams of the image forming optical system of the example 9.
Figure 10A:
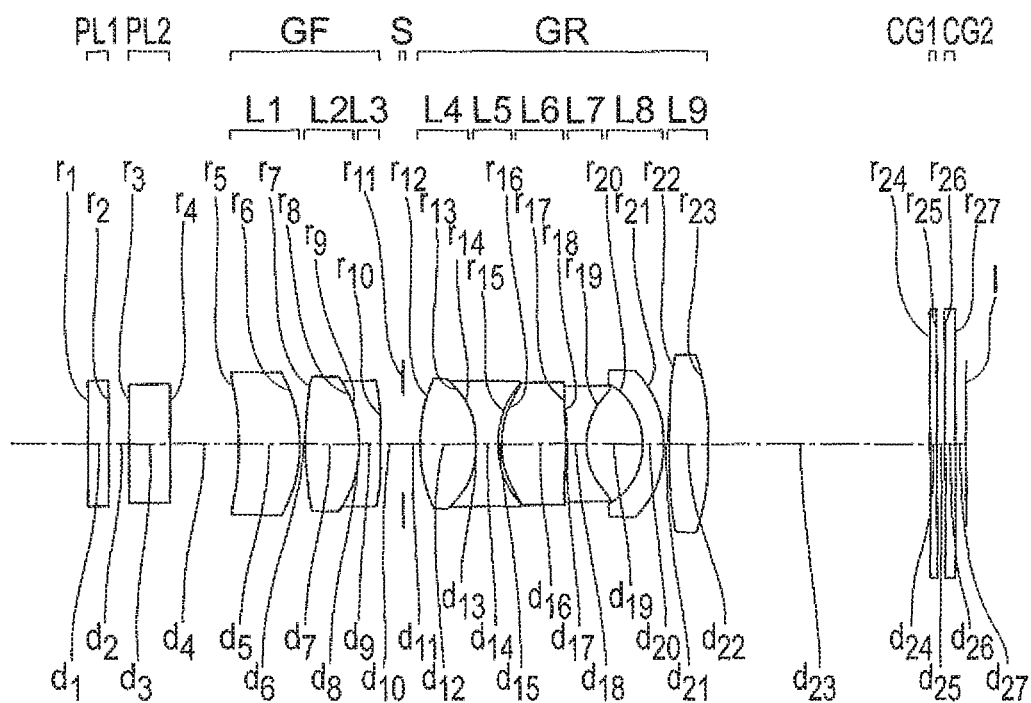
FIG. 10A is a lens cross-sectional view of an image forming optical system of an example 10.
Figures 10B, 10C, 10D, 10E:
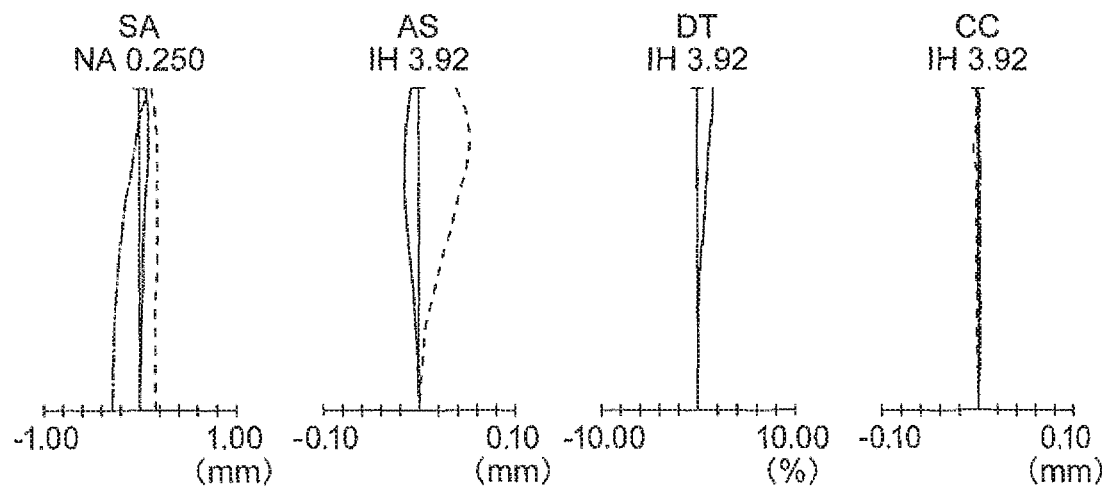
FIG. 10B, FIG. 10C, FIG. 10D, and FIG. 10E are aberration diagrams of the image forming optical system of the example 10.

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

An information acquisition apparatus of the present embodiment includes an illuminating section, an image forming optical system, and an image pickup element. The illuminating section includes a light source and an illuminating optical system. An image pickup surface of the image pickup element is positioned on an image side of the image forming optical system. The image forming optical system includes in order from an object side, an incidence-side lens unit having a positive refractive power, an aperture section, and an emergence-side lens unit having a positive refractive power. An entrance pupil and an exit pupil are formed by the incidence-side lens unit, the aperture section, and the emergence-side lens unit. The incidence-side lens unit includes a plurality of positive lenses and at least one negative lens, and the emergence-side lens unit includes a plurality of positive lenses and at least one negative lens, and the following conditional expressions (1) to (9) are satisfied:

$$-6 < \beta d < -0.8 \quad (1)$$

$$-0.5 < TL/|ENPL| < 3.0 \quad (2)$$

$$-1.5 < TL/|EXPL| < 0.5 \quad (3)$$

$$0.001 < |\Delta Cd|/Sim^{1/2} < 0.05 \quad (4)$$

$$0.04 < |\Delta dF|/Sim^{1/2} < 0.28 \quad (5)$$

$$3.5 < |\Delta CF|/|\Delta Cd| < 38.0 \quad (6)$$

$$0 < |\Delta SAd|/|\Delta CF| < 0.27 \quad (7)$$

$$0 < |\Delta SAC|/|\Delta CF| < 0.16 \quad (8)$$

$$0 < |\Delta SAF|/|\Delta CF| < 1.1 \quad (9)$$

where,

βd denotes a lateral magnification of the image forming optical system for a d-line, TL denotes a distance between an optical surface positioned nearest to an object of the image forming optical system and the image plane, ENPL denotes a distance from a lens surface positioned nearest to the object of the image forming optical system up to the entrance pupil, EXPL denotes a distance from a lens surface positioned nearest to an image of the image forming optical system up to the exit pupil, ΔCd denotes a difference between an image forming position for the d-line and an image forming position for a C-line, ΔdF denotes a difference between the image forming position for the d-line and an image forming position for an F-line, ΔCF denotes a difference between the image forming position for the C-line and the image forming position for the F-line, Sim denotes an area of an effective image pickup area on the image pickup surface, ΔSAd denotes the maximum amount of a spherical aberration for the d-line, ΔSAC denotes the maximum amount of a spherical aberration for the C-line, and ΔSAF denotes the maximum amount of a spherical aberration for the F-line, and here the distance is a distance for the d-line, the image forming position is an image position by a paraxial light ray, and the distance and the difference are a distance on the optical axis and a difference on the optical axis, respectively.

The information acquisition optical system of the present embodiment includes the illuminating section, the image forming optical system, and the image pickup element. The illuminating section includes the light source and the illuminating optical system. The image pickup surface of the image pickup element is positioned on the image plane of the image forming optical system.

Illumination light is emitted from the light source. The illumination light is irradiated to the object. Light from the object is incident on the image forming optical system. Light incident on the image forming optical system is focused on the image plane. As a result, an optical image of the object is formed on the image plane. The image pickup surface of the image pickup element is positioned on the image plane. Accordingly, the optical image is formed on the image pickup surface.

The optical image is captured by the image pickup element. Accordingly, an image of the object is acquired. In the image acquisition apparatus of the present embodiment, it is possible to acquire information of the object from an acquired image. The information of the object includes information such as a size of the object, a shape of the object, and the number of objects.

The image forming optical system includes in order from the object side, the incidence-side lens unit having a positive refractive power, the aperture section, and the emergence-side lens unit having a positive refractive power. The incidence-side lens unit is disposed on the object side of the aperture section. The emergence-side lens unit is disposed on the image side of the aperture section.

The incidence-side lens unit includes the plurality of lenses and at least one negative lens, and the emergence-side lens unit includes the plurality of lenses and at least one negative lens. By making such arrangement, it is possible correct an aberration favorably in each of the incidence-side lens unit and the emergence-side lens unit.

In a case in which a value does not exceed an upper limit value of conditional expression (1), the image forming optical system becomes a magnifying optical system. In this case, the optical image of the object becomes a magnified image. Consequently, it is possible to acquire the information of the object in detail.

In a case in which the value is close to the upper limit value of conditional expression (1), a magnification of the image forming optical system is slightly larger than a magnification of an equal-magnification optical system. Even in this case, since the image forming optical system becomes the magnifying optical system, it is possible to acquire the information of the object in detail.

In a case in which the value does not fall below a lower limit value of conditional expression (1), the magnification of the image forming optical system does not become excessively large. In this case, since a field of view of the image forming optical system (hereinafter, referred to as 'field of view') does not become excessively narrow, it becomes easy to bring the object in the visual field, or to position the object in the visual field.

In case in which a value satisfies conditional expression (2), the image forming optical system becomes a substantially telecentric optical system on the object side. Moreover, in a case in which a value satisfies conditional expression (3), the image forming optical system becomes a substantially telecentric optical system on the image side.

The information acquisition apparatus of the present embodiment satisfies condition expressions (2) and (3). Accordingly, the image forming optical system, on both of the object side and the image side, is either a telecentric optical system or almost telecentric optical system (hereinafter, referred to as 'both-side telecentric optical system').

In the both-side telecentric optical system, either a position of the entrance pupil coincides with a focal point of the optical system or the position of the entrance pupil is positioned near the focal point of the optical system. Furthermore, either a position of the exit pupil coincides with a focal point of the optical system or the position of the exit pupil is positioned near the focal point of the optical system.

When the object and the optical system move relatively in an optical axial direction, a size of the optical image varies before movement and after movement. In a telecentric optical system, even when the object and the optical system move relatively in the optical axial direction, a variation in the size of the optical image is small. In other words, in a telecentric optical system, it is possible to make a variation in the lateral magnification small.

Moreover, when the object and the optical system move relatively in a direction perpendicular to an optical axis, a parallax in the optical image varies before movement and after movement. In a telecentric optical system, even when the object and the optical system move relatively in a direction perpendicular to the optical axis, a variation in the parallax is small.

As mentioned above, in the information acquisition apparatus of the present embodiment, the image forming optical system is a both-side telecentric optical system. Accordingly, even when the object and the image forming optical system move relatively in the optical axial direction, it is possible to make small the variation in the lateral magnification. Moreover, even when the object and the image forming optical system move relatively in the optical axial direction, it is possible to make small the variation in the parallax. As a result, in the information acquisition apparatus of the present embodiment, it is possible to make small an error in a size of an objet and to make small an error in a shape of an object.

For instance, in a case of acquiring a plurality of images by a shifting movement of the image forming optical system, and acquiring an image of a wide field of view by synthesizing images, since the parallax of the images is small, it is possible to reduce a load of signal processing at a time of carrying out the image synthesis. Moreover, in a case in which the illumination light is let to be an oblique illumination, by letting the image forming optical system to be a telecentric optical system on the object side, it is possible to take in oblique illumination light uniformly in the entire field of view.

In an optical system, it is preferable that all aberrations be corrected favorably. When an attempt is made to make such state, the number of lenses increases or lenses become large in size. This tendency increases further in the both-side telecentric optical system.

As mentioned above, in the information acquisition apparatus of the present embodiment, the image forming optical system is a both-side telecentric optical system.

Consequently, when an attempt is made to correct all the aberrations favorably, it leads to an increase in the number of lenses or to making large the size of lenses.

Conditional expressions (4), (5), and (6) are conditional expressions related to a longitudinal chromatic aberration.

In a case in which a value satisfies conditional expression (4), a slight chromatic aberration for the C-line occurs with respect to the d-line. In a case in which a value satisfies conditional expression (4), a slight chromatic aberration for the F-line occurs with respect to the d-line. In a case in which a value satisfies conditional expression (6), a slight chromatic aberration for the d-line and the F-line occurs with respect to the C-line. Since an occurrence of a slight chromatic aberration is acceptable, it is possible to suppress the number of lenses or to suppress the size of lenses from becoming large.

In a case in which the value falls below a lower limit value of conditional expression (4), in a case in which the value falls below a lower limit value of conditional expression (5), and in a case in which the value falls below a lower limit value of conditional expression (6), an amount of occurrence of the chromatic aberration becomes excessively small. This signifies that the chromatic aberration has to be corrected favorably. Consequently, this leads to an increase in the number of lenses or to making large the size of lenses.

In a case in which the value exceeds an upper limit value of conditional expression (4), in a case in which the value exceeds an upper limit value of conditional expression (5) is exceeded, and in a case in which the value exceeds an upper limit value of conditional expression (6), the amount of occurrence of the chromatic aberration becomes excessively large. Consequently, in a case in which an object is illuminated by white light, it is not possible to form an optical image sharply by the white light. As a result, it becomes difficult to capture the size or shape of the image precisely.

By letting the illumination light to be virtually monochromatic light, an effect of the longitudinal chromatic aberration is reduced. However, when an aberration of the optical system to an extent of exceeding upper limit value occurs, in a case in which a wavelength width of the monochromatic light is large, the effect of the chromatic aberration is exerted. For narrowing the wavelength width of the monochromatic light, it is necessary to devise an idea such as using a color filter that causes a drop in a quantity of light.

Conditional expressions (7), (8), and (9) are conditional expressions related to the spherical aberration. The maximum amount of the spherical aberration is a difference between a position at which a predetermined light ray intersects the optical axis, and an image forming position. The predetermined light ray is a light ray among all light rays emerging from a point on the optical axis and passing through a pupil, which intersects the optical axis at a position farthest from the image forming position.

A value does not fall below a lower limit value of conditional expression (7), a value does not fall below a lower limit value of conditional expression (8), and a value does not fall below a lower limit value of conditional expression (9).

In a case in which the value does not exceed an upper limit value of conditional expression (7), it is possible to reduce the spherical aberration for the d-line. Consequently, it is possible to form a sharp optical image at a wavelength of the d-line. In a case in which the value does not exceed an upper limit value of conditional expression (8), it is possible to reduce the spherical aberration for the C-line. Consequently, it is possible to form a sharp optical image at a wavelength of the C-line. In a case in which the value does not exceed an upper limit value of conditional expression (9), it is possible to reduce the spherical aberration for the F-line. Consequently, it is possible to form a sharp optical image at a wavelength of the F-line.

As mentioned above, in the information acquisition apparatus of the present embodiment, the image forming optical system in which an occurrence of the longitudinal chromatic aberration is acceptable has been used. Consequently, small-sizing and cost reduction of the image forming optical system are possible. However, in the information acquisition apparatus of the present embodiment, aberrations other than the longitudinal chromatic aberration, and particularly the spherical aberration, are corrected favorably. Consequently, by letting the light which forms an optical image to be light in a restricted wavelength band, it is possible to eliminate an effect due to the longitudinal chromatic aberration.

In such manner, in the information acquisition apparatus of the present embodiment, the small-sizing and cost reduction of the image forming optical system are possible while suppressing a degradation of an optical image to minimum.

It is preferable that the information acquisition apparatus of the present embodiment include a transparent stage, and the object is positioned on one side, sandwiching the stage, and the illuminating section, the image forming optical system, and the image pickup element are disposed on the other side, sandwiching the stage, and the illuminating optical system includes a collimating optical system, and collimated light is generated by the collimating optical system, and an optical axis of the illuminating optical system is decentered with respect to an optical axis of the image forming optical system.

The information acquisition apparatus of the present embodiment includes the stage. A material that allows light to be transmitted through is used for the stage. An object is positioned on one side, sandwiching the stage. The one side is an upper side of the stage. In a case in which the object is accommodated in a container, the container is to be placed on the stage.

In a case in which the object is a living cell for instance, the cell is to be accommodated in the container with a culture solution. The container has an accommodating portion and a top plate. A shape of the accommodating portion is a concave shape. The cell and the culture solution are to be accommodated in the accommodating portion. The top plate is positioned at an upper side of the accommodating portion. A material that allows light to be transmitted through is used for the accommodating portion and the top plate.

The illuminating section, the image forming optical system, and the image pickup element are disposed on the other side, sandwiching the stage. The other side is a lower side of the stage. Therefore, the illumination light is irradiated to the container from the lower side of the stage. Moreover, the optical image is also formed on the lower side of the stage.

It is preferable that an optical axis of the image forming optical system be parallel to a normal of a plane of the stage. When such arrangement is made, the image forming optical system is right in front of the object. As a result, it is possible to exert adequately an optical performance of the image forming optical system.

The illuminating optical system includes the collimating optical system. Collimating light is generated in the collimating optical system. The collimating light is irradiated to a bottom of the accommodating portion.

An optical axis of the illuminating optical system is decentered with respect to the optical axis of the image forming optical system. Decentering includes tilting and shifting.

In a tilted state, the optical axis of the illuminating optical system and the optical axis of the image forming optical system intersect on one side. Consequently, even when the light source is positioned on the optical axis of the illuminating optical system, light emitted from the illuminating section is incident to be inclined with respect to the optical axis of the image forming optical system.

In a shifted state, the optical axis of the illuminating optical system is parallel to the optical axis of the image forming optical system. Moreover, the light source is disposed at the position away from the optical axis of the illuminating optical system. Consequently, the light emerged from the illuminating section is incident to be inclined with respect to the optical axis of the image forming optical system.

In both of the tilted state and the shifted state, a point of intersection of the optical axis of the illuminating optical system and the stage is away from the optical axis of the image forming optical system. Consequently, an area on the stage through which the collimating light passes is positioned at an outer side of the field of view.

Collimating light passed through the stage is incident on the bottom of the container. At this time, the collimating light is irradiated to the bottom of the container from a direction intersecting the optical axis of the image forming optical system. Collimating light passed through the bottom of the container is incident on the top plate. A portion of the collimating light is reflected at the top plate.

The collimating light is incident on the top plate from a direction intersecting the optical axis of the image forming optical system. Consequently, the collimating light is reflected in a direction of approaching closer to the optical axis of the image forming optical system. As a result, the object within the field of view is irradiated.

As mentioned above, the illumination light being the collimating light, the field of view is illuminated without excess and deficiency. Moreover, the illumination light reflected at the top plate is irradiated to the object from the direction intersecting the optical axis of the image forming optical system. Consequently, in the information acquisition apparatus of the present embodiment, the object is subjected to oblique illumination.

As the object is subjected to oblique illumination, an angle of a light ray emerging from the object varies in accordance with an angle of inclination of a surface of the object. As the angle of inclination of a light ray emerging from the object varies, a quantity of light passing through the aperture section varies. As a result, even when the object is transparent, an optical image of the object having a contrast is formed. The optical image which is formed has a shadow similar to that of an optical image achieved by phase-contrast microscopy or differential interference contrast microscopy.

In the information acquisition apparatus of the present embodiment, the illuminating section, the image forming optical system, and the image pickup apparatus are disposed at a lower side of the stage, and an object is subjected to the oblique illumination. Accordingly, in the information acquisition apparatus of the present embodiment, it is possible to realize small-sizing of apparatus and formation of an optical image having a high contrast.

In the information acquisition apparatus of the present embodiment, it is preferable that an optical surface having a diffusion effect is disposed in the illuminating section.

As mentioned above, in the information acquisition apparatus of the present embodiment, the illumination light is reflected at the top plate. Consequently, in a case in which the top plate and a stage surface are not parallel, a reflection direction of the illumination light at the top plate is misaligned from an intended reflection direction. As the reflection direction of the illumination light is misaligned from the intended reflection direction, an irradiated position of the illumination light with respect to the field of view is shifted. In this case, the illumination light becomes dark in a portion of the field of view. As a result, a portion of the optical image becomes dark.

In a case in which the illumination light becomes dark in a portion of the field of view, by widening a light-beam diameter of the illumination light, the illumination light is made to be incident on the entire field of view. However, when the misalignment from the intended reflection direction is excessively large, even when the light-beam diameter is widened, the illumination light is deviated from an entrance pupil of the image forming optical system. Consequently, the illumination light becomes dark throughout the entire field of view.

When the optical surface having the diffusion effect is disposed in the illuminating section, an area of the illumination light irradiated to the container is widened. Moreover, even when the reflection direction of the illumination light varies with respect to the intended reflection direction, a portion of the illumination light enters into the entrance pupil of the image forming optical system. Accordingly, it is possible to make light from an object positioned within the field of view reach up to an image pickup portion. Consequently, even in a case in which the top plate and the stage surface are not parallel or in a case in which a liquid level and the stage surface is not parallel, it is possible to illuminate the field of view without excess and deficiency.

An inclination of the top plate with respect to the stage surface or an inclination of the liquid level with respect to the stage surface is insignificant in many cases. Therefore, the diffusion effect may be small. By disposing an optical surface having a small diffusion effect, it is possible to maintain virtually characteristics of collimating light in the illumination light after having the diffusion effect.

It is preferable to dispose the optical surface having a diffusion effect at any of a position between the light source and the collimating optical system, a position in the collimating optical system, and a position between the collimating optical system and the stage.

As an optical surface having a diffusion effect, a diffusing surface of a diffusion plate is available. It is possible to prepare a plurality of diffusion plates having different diffusion effect. The diffusion plate is to be used appropriately in accordance with the inclination of the top plate with respect to the stage surface or the inclination of the liquid level with respect to the stage surface.

A lens is disposed in the illuminating optical system. It is possible to make a lens surface an optical surface having a diffusion effect. As mentioned above, the diffusion effect is small. Consequently, even when the lens surface is imparted with the diffusion effect, there is no effect on imaging performance of the lens.

In a case in which an optical filter is disposed in the illuminating section, it is possible to make a surface of the optical filter an optical surface having a diffusion effect.

In the information acquisition apparatus of the present embodiment, it is preferable that the following conditional expression (10) be satisfied:

$$1.6 < Sco/Sen < 20.0 \tag{10}$$

where,

Sco denotes a cross-sectional area of a light beam emitted from the illuminating section, and Sen denotes an area of a surface of incidence of the image forming optical system.

Containers having various shapes and various sizes are placed on the stage. Therefore a distance from a bottom portion up to the top plate differs according to the container. Moreover, even for containers having same shape and size, the distance from the bottom portion up to the top plate sometimes varies due to a manufacturing error.

As mentioned above, in the information acquisition apparatus of the present embodiment, the illumination light is reflected at the top plate. Therefore, when the distance from the bottom portion up to the top plate varies, an irradiating position of the illumination light with respect to the field of view is shifted. In this case, the illumination light becomes dark in a portion of the field of view. As a result, a portion of the optical image becomes dark.

In a case in which a value does not fall below a lower limit value of conditional expression (10), it is possible to make large an area of a surface of emergence of the collimating optical system. Consequently, even when the distance from the bottom portion up to the top plate differs, it is possible to illuminate the field of view without excess and deficiency.

In a case in which the value does not exceed an upper limit value of conditional expression (10), it is possible to make the collimating optical system small-sized. Therefore, it is preferable that the value does not exceed the upper limit value of conditional expression (10).

In the information acquisition apparatus of the present embodiment, it is preferable that a plurality of optical images is formed with a time lag on the image pickup surface, and each of the plurality of optical images is formed by light having a restricted wavelength band, and a wavelength for which a light intensity is the maximum in the wavelength band, differs for each of the plurality of optical images.

When the optical image of the object is captured upon changing a focus position, it is possible to acquire information of a shape of the object from an image achieved by capturing. As a method of changing the focus position, a method of moving some lenses of the image forming optical system or a method of moving the image forming optical system and the image pickup element integrally, is available. In each of the methods, a moving mechanism becomes necessary.

However, when the moving mechanism is provided, the apparatus becomes large in size. Moreover, vibrations and heat are generated due to the movement. Therefore, it is preferable not to provide the moving mechanism for changing the focus position.

In the information acquisition apparatus of the present embodiment, the plurality of optical images is formed with a time lag on the image pickup surface.

For instance, when light of a wavelength of the d-line, light of a wavelength of the C-line, and light of a wavelength of the F-line are used, three optical images are formed on the image pickup surface. At this time, each of the three optical images is formed with the time lag. Accordingly, it is possible to capture each of the three optical images independently. As a result, it is possible to acquire an image corresponding to the optical image individually for each wavelength.

In a case of using the light of the wavelength of the d-line, it is possible to let light of a restricted band width to be any one of the following (I), (II), and (III). Similar is true in a case of using the light of the wavelength of the C-line and in a case of using the light of the wavelength of the F-line.

(I) Light which includes light of the wavelength of the d-line and light of a wavelength shorter than the wavelength of the d-line.

(II) Light which includes light of the wavelength of the d-line and light of a wavelength longer than the wavelength of the d-line.

(III) Light which includes light of the wavelength of the d-line, the light of the wavelength shorter than the wavelength of the d-line, and light of the wavelength longer than the wavelength of the d-line.

In such manner, when the light of the restricted wavelength is used, it is possible to form an optical image of adequate brightness as compared to a case of using the monochromatic light. However, in a case in which it is possible to form an optical image of adequate brightness, light which forms the optical image may be monochromatic light.

In the information acquisition apparatus of the present embodiment, although the spherical aberration is corrected favorably, slight longitudinal chromatic aberration occurs. Consequently, in the information acquisition apparatus of the present embodiment, the image forming position differs according to the wavelength of light. In other words, the focus position differs according to the wavelength of light.

Therefore, a wavelength for which the light intensity is the maximum in the restricted wavelength band is let to differ for each of the plurality of optical images. By making such arrangement, it is possible to form a plurality of optical images with different focus positions, on the image pickup surface.

The plurality of optical images is formed with a time lag. Accordingly, it is possible to capture the optical images with different focus positions independently for each wavelength. As a result, it is possible to acquire the images with different focus positions independently for each wavelength.

In a case of using the light of the wavelength of the d-line for the formation of an optical image, it is preferable to let the wavelength for which the light intensity is the maximum in the wavelength band to be the light of the wavelength of the d-line in each of (I), (II), and (III). Similar is true in the case of using the light of the wavelength of the C-line and in the case of using the light of the wavelength of the F-line.

As a result, an optical image d, and optical image C, and an optical image F are formed. The optical image d is an optical image formed by light including the light of the wavelength of the d-line. The optical image C is an optical image formed by light including the light of the wavelength of the C-line. The optical image F is an optical image formed by light including the light of the wavelength of the F-line.

The information acquisition apparatus of the present embodiment satisfies conditional expressions (4), (5), and (6). Consequently, the image forming position differs for each of the light of the wavelength of the d-line, the light of the wavelength of the C-line, and the light of the wavelength of the F-line. In other words, the focus position differs for each of the light of the wavelength of the d-line, the light of the wavelength of the C-line, and the light of the wavelength of the F-line. Accordingly, the focus position differs for each of the optical image d, the optical image C, and the optical image F.

Each of the optical image d, the optical image C, and the optical image F is formed with a time lag. Accordingly, optical images with different focus positions are captured independently for each wavelength. As a result, it is possible to acquire images with different focus positions independently for each wavelength.

For instance, for an object in which a plurality of cells is overlapping, an outline of the object is captured in all of an image of the optical image d, an image of the optical image C, and an image of the optical image F. Consequently, it is possible to verify each of a cell image at a focus position for the d-line, a cell image at a focus position for the C-line, and a cell image at a focus position for the F-line. Accordingly, even in the state of the cells overlapping, it is possible to verify each cell.

In such manner, each of the three images has different information. Accordingly, it is possible to acquire information of a depth direction of an object from the three images. Moreover, by synthesizing the three images, it is possible to achieve an image having a deep focal depth.

In the information acquisition apparatus of the present embodiment, there is no movement of a lens in the image forming optical system and no integral movement of the image forming optical system and the image pickup element. Consequently, the apparatus does not become large in size and it is possible to suppress the generation of vibrations and generation of heat.

It is preferable that the information acquisition apparatus of the present embodiment include a control unit and a plurality of light sources, and the control unit carry out control of switching light ON and OFF for each of the plurality of light sources, and the number of light sources be same as multiples of the plurality of optical images, and each of the plurality of light sources emit light of a restricted wavelength band, and a wavelength of light which forms the optical image and a wavelength band of light which is emitted from the light source correspond one-to-one.

It is possible to form the plurality of optical images with a time lag. Moreover, it is possible to shorten the time lag.

It is preferable that the image acquisition apparatus of the present embodiment include a control unit and a plurality of optical filters, and the control unit carry out a control of putting each of the plurality of optical filters in and out of an optical path, and light emitted from the light source include all lights of wavelength bands forming the plurality of optical images, and each of the plurality of optical filters allow light of a restricted wavelength to be transmitted through, and a wavelength band of light which forms the optical image and a wavelength band of light which is emerged from the optical filter correspond one-to-one.

It is possible to form the plurality of optical images with a time lag. The optical filter may be put in and out between the light source and the object or between the object and the image pickup element.

In the information acquisition apparatus of the present embodiment, it is preferable that four optical images be formed.

It is possible to acquire information of the object in further detail.

In the information acquisition apparatus of the present embodiment, it is preferable that a first optical image, a second optical image, a third optical image, and a fourth optical image be formed, and the following conditional expressions (11), (12), (13), and (14) be satisfied:

$$600 \text{ nm} < \lambda 1 < 650 \text{ nm} \quad (11)$$

$$50 \text{ nm} < \lambda 2 - \lambda 1 < 300 \text{ nm} \quad (12)$$

$$-200 \text{ nm} < \lambda 3 - \lambda 1 < -50 \text{ nm} \quad (13)$$

$$-200 \text{ nm} < \lambda 4 - \lambda 3 < -50 \text{ nm} \quad (14)$$

where, $\lambda 1$ denotes a peak wavelength in the first optical image, $\lambda 2$ denotes a peak wavelength in the second optical image, $\lambda 3$ denotes a peak wavelength in the third optical image, and $\lambda 4$ denotes a peak wavelength in the fourth optical image, and here the peak wavelength is a wavelength for which a light intensity is the maximum in the wavelength band forming the optical images.

It is possible to acquire the information of an object in further detail.

In the information acquisition apparatus of the present embodiment, it is preferable that the image pickup element be an image pickup element which acquires a monochromatic image, not having a color filter.

It is possible to acquire a bright image irrespective of the wavelength band of an optical image formed on the image pickup surface.

It is preferable that the information acquisition apparatus of the present embodiment include an image processing section, and a plurality of images be acquired by capturing a plurality of optical images, and the image processing section synthesize the plurality of images, and create an image in which a focusing range is widened.

The information acquisition apparatus of the present embodiment is capable of acquiring images with different focus positions independently for each wavelength. By synthesizing the images acquired, an image in which the focusing range is widened is acquired.

It is preferable that the information acquisition apparatus of the present embodiment include a moving mechanism, and the moving mechanism move the illuminating section, the image forming optical system, and the image pickup element within a plane orthogonal to the optical axis of the image forming optical system.

In a case in which the object is spread up to an outer side of the field of view, it is not possible to acquire information of a portion positioned at the outer side of the field of view. By moving the illuminating section, the image forming optical system, and the image pickup element within the plane orthogonal to the optical axis of the image forming optical system, it is possible to move the field of view with respect to the object. As a result, it is possible to acquire the information of the portion positioned at the outer side of the field of view.

In the information acquisition apparatus of the present embodiment, each of the illuminating section, the image forming optical system, and the image pickup element is positioned at the lower side of the stage. Accordingly, it is possible to move integrally the illuminating section, the image forming optical system, and the image pickup element. As a result, it is possible to make the moving mechanism simple as compared to that in a case in which the illuminating section is disposed on the upper side of the stage.

Examples of the image forming optical system will be described below in detail by referring to the accompanying diagrams. However, the present invention is not restricted to the examples described below.

The diagrams will be described below. In the diagrams of the examples, FIG. 1A, FIG. 2A, FIG. 3A, FIG. 4A, FIG. 5A, FIG. 6A, FIG. 7A, FIG. 8A, FIG. 9A, and FIG. 10A show cross-sectional views of image forming optical systems. PL1 and PL2 denote plane parallel plates, and CG, CG1, and CG2 denote cover glasses.

An image forming optical system of each example is used in the information acquisition apparatus. In the information acquisition apparatus, a container is placed on the stage. The image forming optical system is disposed on an opposite side of the container, sandwiching the container.

The plane parallel plate PL1 is the bottom of the container and the plane parallel plate PL2 is the stage. The cover glass CG and the cover glass CG2 are glasses for protecting the image pickup surface.

Aberration diagrams will be described below.

FIG. 1B, FIG. 2B, FIG. 3B, FIG. 4B, FIG. 5B, FIG. 6B, FIG. 7B, FIG. 8B, FIG. 9B, and FIG. 10B show a spherical aberration (SA).

FIG. 1C, FIG. 2C, FIG. 3C, FIG. 4C, FIG. 5C, FIG. 6C, FIG. 7C, FIG. 8C, FIG. 9C, and FIG. 10C show an astigmatism (AS).

FIG. 1D, FIG. 2D, FIG. 3D, FIG. 4D, FIG. 5D, FIG. 6D, FIG. 7D, FIG. 8D, FIG. 9D, and FIG. 10D show a distortion (DT).

FIG. 1E, FIG. 2E, FIG. 3E, FIG. 4E, FIG. 5E, FIG. 6E, FIG. 7E, FIG. 8E, FIG. 9E, and FIG. 10E show a chromatic aberration of magnification (CC).

An image forming optical system of an example 1 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a planoconvex positive lens L1, a biconvex positive lens L2, a negative meniscus lens L3 having a convex surface directed toward an image side, a biconvex positive lens L4, and a biconcave negative lens L5. Here, the biconvex positive lens L2 and the negative meniscus lens L3 are cemented. The biconvex positive lens L4 and the biconcave negative lens L5 are cemented.

The emergence-side lens unit GR includes a biconvex positive lens L6, a biconcave negative lens L7, a planoconcave negative lens L8, a planoconvex positive lens L9, and a biconvex positive lens L10. Here, the biconvex positive lens L6 and the biconcave negative lens L7 are cemented. The planoconcave negative lens L8 and the planoconvex positive lens L9 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

An image forming optical system of an example 2 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a positive meniscus lens L1 having a convex surface directed toward an image side, a biconvex positive lens L2, a negative meniscus lens L3 having a convex surface directed toward the image side, a biconvex positive lens L4, and a biconcave negative lens L5.

Here, the biconvex positive lens L2 and the negative meniscus lens L3 are cemented. The biconvex positive lens L4 and the biconcave negative lens L5 are cemented.

The emergence-side lens unit GR includes a biconvex positive lens L6, a biconcave negative lens L7, a planoconcave negative lens L8, a planoconvex positive lens L9, and a biconvex positive lens L10. Here, the biconvex positive lens L6 and the biconcave negative lens L7 are cemented. The planoconcave negative lens L8 and the planoconvex positive lens L9 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

An image forming optical system of an example 3 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a positive meniscus lens L1 having a convex surface directed toward an image side, a biconvex positive lens L2, and a negative meniscus lens L3 having a convex surface directed toward an image side. Here, the biconvex positive lens L2 and the negative meniscus lens L3 are cemented.

The emergence-side lens unit GR includes a biconvex positive lens L4, a biconcave negative lens L5, a positive meniscus lens L6 having a convex surface directed toward the object side, a negative meniscus lens L7 having a convex surface directed toward the object side, a negative meniscus lens L8 having a convex surface directed toward the image side, and a biconvex positive lens L9. Here, the biconvex positive lens L4 and the biconcave negative lens L5 are cemented. The positive meniscus lens L6 and the negative meniscus lens L7 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

An image forming optical system of an example 4 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a positive meniscus lens L1 having a convex surface directed toward an image side, a biconvex positive lens L2, a negative meniscus lens L3 having a convex surface directed toward the image side, and a planoconvex positive lens L4. Here, the biconvex positive lens L2 and the negative meniscus lens L3 are cemented.

The emergence-side lens unit GR includes a biconvex positive lens L5, a planoconvex positive lens L6, a planoconcave negative lens L7, a planoconcave negative lens L8, and a biconvex positive lens L9. Here, the planoconvex positive lens L6 and the planoconcave negative lens L7 are cemented.

A plane parallel plate PL1 and a plane parallel plate PL2 are disposed on the object side of the incidence-side lens unit GF. A cover glass CG is disposed on the image side of the emergence-side lens unit GR.

An aspheric surface is provided to a total of two surfaces, which are both surfaces of the biconvex positive lens L5.

An image forming optical system of an example 5 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a biconvex positive lens L1, a biconvex positive lens L2, a biconcave negative lens L3, and a biconvex positive lens L4. Here, the biconvex positive lens L2 and the biconcave negative lens L3 are cemented.

The emergence-side lens unit GR includes a biconvex positive lens L5, a biconvex positive lens L6, a biconcave negative lens L7, a biconcave negative lens L8, a biconvex positive lens L9, and a positive meniscus lens L10 having a convex surface directed toward the object side. Here, the biconvex positive lens L6 and the biconcave negative lens L7 are cemented. The biconcave negative lens L8 and the biconvex positive lens L9 are cemented.

A plane parallel plate PL1 and a plane parallel plate PL2 are disposed on the object side of the incidence-side lens unit GF. A cover glass CG1 and a cover glass CG2 are disposed on an image side of the emergence-side lens unit GR.

An aspheric surface is provided to a total of two surfaces, which are both surfaces of the biconvex positive lens L5.

An image forming optical system of an example 6 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a biconvex positive lens L1, a biconvex positive lens L2, a negative meniscus lens L3 having a convex surface directed toward an image side, a positive meniscus lens L4 having a convex surface directed toward the object side, and a negative meniscus lens L5 having a convex surface directed toward the object side. Here, the biconvex positive lens L2 and the negative meniscus lens L3 are cemented. The positive meniscus lens L4 and the negative meniscus lens L5 are cemented.

The emergence-side lens unit GR includes a biconvex positive lens L6, a biconcave negative lens L7, a negative meniscus lens L8 having a convex surface directed toward the image side, a positive meniscus lens L9 having a convex surface directed toward the image side, and a biconvex positive lens L10. Here, the biconvex positive lens L6 and the biconcave negative lens L7 are cemented. The negative meniscus lens L8 and the positive meniscus lens L9 are cemented.

A plane parallel plate PL1 and a plane parallel plate PL2 are disposed on the object side of the incidence-side lens unit GF. A cover glass CG is disposed on the image side of the emergence-side lens unit GR.

An aspheric surface is provided to a total of two surfaces, which are an object-side surface of the positive meniscus lens L4 and an image-side surface of the positive meniscus lens L9.

An image forming optical system of an example 7 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a positive meniscus lens L1 having a convex surface directed toward an image side, a positive meniscus lens L2 having a convex surface directed toward the image side, a negative meniscus lens L3 having a convex surface directed toward the image side, and a planoconvex positive lens L4. Here, the positive meniscus lens L2 and the negative meniscus lens L3 are cemented.

The emergence-side lens unit GR includes a positive meniscus lens L5 having a convex surface directed toward the object side, a negative meniscus lens L6 having a convex surface directed toward the object side, a negative meniscus lens L7 having a convex surface directed toward the image side, and a biconvex positive lens L8. Here, the positive meniscus lens L5 and the negative meniscus lens L6 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

An aspheric surface is provided to a total of four surfaces, which are both surfaces of the biconvex positive lens L4 and both surfaces of the negative meniscus lens L7.

An image forming optical system of an example 8 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a planoconvex positive lens L1, a positive meniscus lens L2 having a convex surface directed toward the object side, and a negative meniscus lens L3 having a convex surface directed toward the object side.

The emergence-side lens unit GR includes a biconcave negative lens L4, a negative meniscus lens L5 having a convex surface directed toward an image side, and a biconvex positive lens L6.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

An aspheric surface is provided to a total of four surfaces, which are both surfaces of the positive meniscus lens L2 and both surfaces of the biconcave negative lens L4.

An image forming optical system of an example 9 includes in order from an object side, an incidence-side lens unit GF having a positive refractive power and an emergence-side lens unit GR having a positive refractive power. An aperture stop S is disposed between the incidence-side lens unit GF and the emergence-side lens unit GR.

The incidence-side lens unit GF includes a positive meniscus lens L1 having a convex surface directed toward an image side, a biconvex positive lens L2, a planoconcave negative lens L3, and a planoconvex positive lens L4. Here, the biconvex positive lens L2 and the planoconcave negative lens L3 are cemented.

The emergence-side lens unit GR includes a biconvex positive lens L5, a planoconvex positive lens L6, a planoconcave negative lens L7, a planoconcave negative lens L8, a planoconvex positive lens L9, and a biconvex positive lens L10. Here, the planoconvex positive lens L6 and the planoconcave negative lens L7 are cemented. The planoconcave negative lens L8 and the planoconvex positive lens L9 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

A plane parallel plate PL3 and a plane parallel plate PL4 are disposed between the incidence-side lens unit GF and the emergence-side lens unit GR. The plane parallel plate PL3 and the plane parallel plate PL4 are cemented. The aperture stop S is positioned on a cemented surface.

An optical filter is formed by the plane parallel plate PL3 and the plane parallel plate PL4. The optical filter has a characteristic of varying a light transmittance from a center toward a periphery. By using such optical filter, it is possible to improve a contrast of an optical image and to widen a dynamic range.

An area in which the transmittance varies may be an entire area of the optical filter or a partial area of the optical filter. For the minimum light transmittance, the maximum light transmittance, and a rate of change of the light transmittance, values which are most appropriate for the improvement of the contrast and widening of the dynamic range are to be set.

An aspheric surface is provided to a total of two surfaces, which are both surfaces of the biconvex positive lens L5.

An image forming optical system of an example 10 includes in order from an object side, an incidence-side lens unit GF having a positive refractive power and an emergence-side lens unit GR having a negative refractive power. An aperture stop S is disposed between the incidence-side lens unit GF and the emergence-side lens unit GR.

The incidence-side lens unit GF includes a positive meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented.

The emergence-side lens unit GR includes a biconvex positive lens L4, a biconcave negative lens L5, a biconvex positive lens L6, a biconcave negative lens L7, a negative meniscus lens L8 having a convex surface directed toward the image side, and a biconvex positive lens L9. Here, the biconvex positive lens L4 and the biconcave negative lens L5 are cemented. The biconvex positive lens L6 and the biconcave negative lens L7 are cemented.

A plane parallel plate PL1 and a plane parallel plate PL2 are disposed on the object side of the incidence-side lens unit GF. A cover glass CG1 and a cover glass CG2 are disposed on the image side of the emergence-side lens unit GR.

Examples of the illuminating section will be described below in detail by referring to the accompanying diagrams. However, the present invention is not restricted to the examples described below. The image forming optical system of the example 2 is used for an image forming optical system OBJ in each example.

APXILL denotes an apex of a lens surface positioned nearest an object in an illuminating optical system ILL. APXOBJ denotes an apex of a lens surface positioned nearest to the object in the image forming optical system OBJ. AXILL denotes an optical axis of the illuminating optical system ILL. AXOBJ denotes an optical axis of the image forming optical system OBJ. DDIF denotes the smallest axial distance between a diffusion plate DIF and a lens surface of the illuminating optical system ILL. θ denotes an angle made by the optical axis AXILL and the optical axis AXOBJ. DAPX denotes an axial distance between the apex APXILL and the apex APXOBJ. DAX denotes a distance between the apex APXILL and the optical axis AXOBJ. DLSO denotes a distance between a surface of emergence of a light source LS and a light-source side surface of a lens L1. DLS1 denotes a distance between the optical axis AXOBJ and a center of a light beam emitted from the light source LS.

Figure 11:
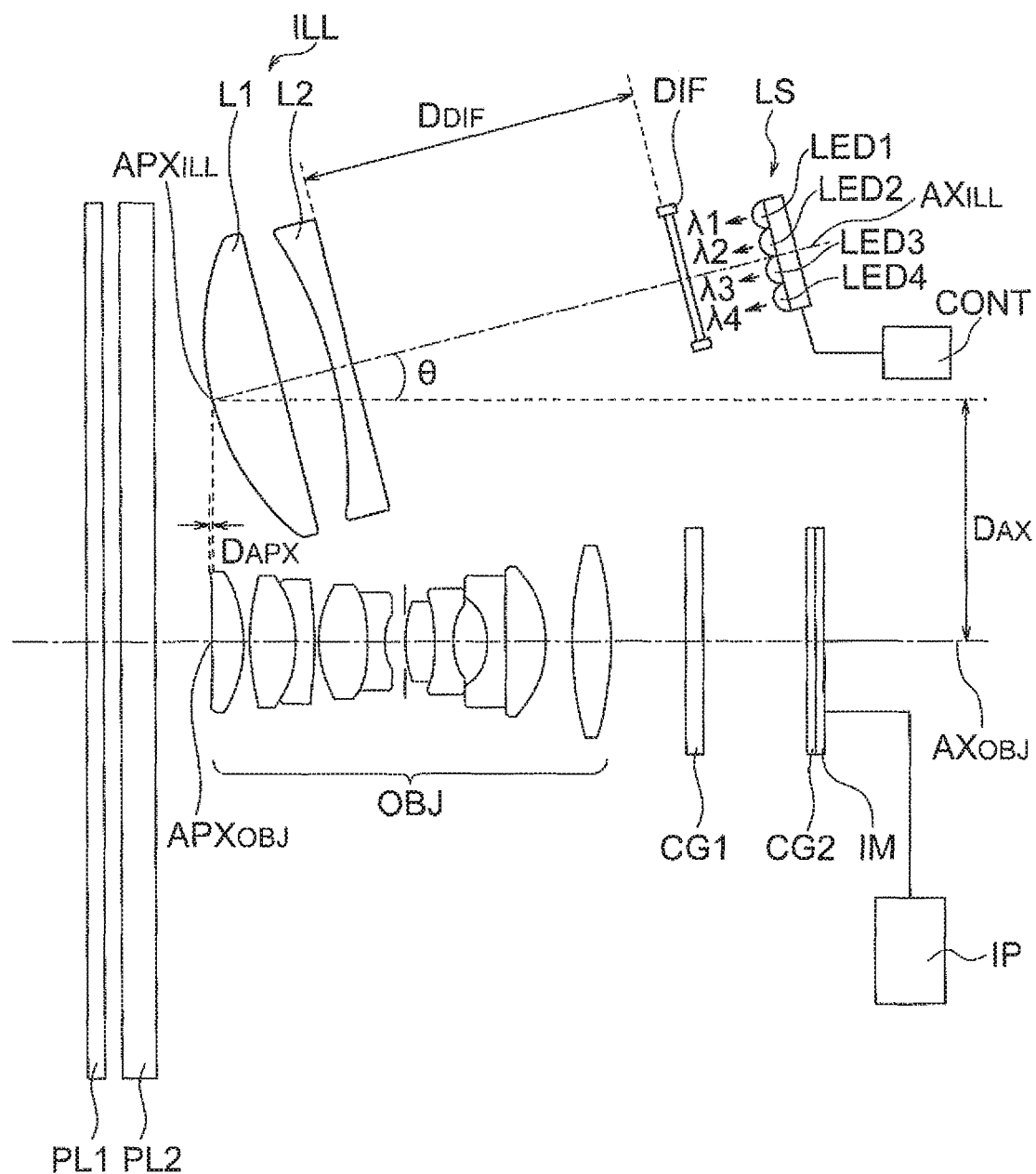
FIG. 11 is a lens cross-sectional view of a first example of an illuminating section.

An illuminating section of a first example, as shown in FIG. 11, includes a light source LS, a diffusion plate DIF, and an illuminating optical system ILL. The illuminating optical system ILL includes a planoconvex positive lens L1 and a planoconcave negative lens L2.

Each of the light source LS, the diffusion plate DIF, the planoconvex positive lens L1, and the planoconcave negative lens L2 is disposed on an optical axis AXILL. An apex APXILL is positioned on an image side of an apex APXOBJ.

The light source LS includes four LEDs (light emitting diodes). A wavelength of light emitted from the four LEDs differs for each LED. For instance, light of a wavelength $\lambda 1$ is emitted from an LED 1. Light of a wavelength $\lambda 2$ is emitted from an LED 2. Light of a wavelength $\lambda 3$ is emitted from an LED 3. Light of a wavelength $\lambda 4$ is emitted from an LED 4.

Light emitted from the light source LS is incident on the diffusion plate DIF. A diameter of the diffusion plate is 5 mm. A distance between the light source LS and the diffusion plate DIF is set upon taking into consideration a diffusion angle for each LED. Accordingly, light emitted from the LED is irradiated to an entire surface of the diffusion plate DIF.

The diffusion plate DIF has an optical surface having a diffusion effect. Light incident on the diffusion plate DIF is diffuses at the optical surface having the diffusion effect. The diffusion effect being small, light emerged from the diffusion plate is diffused slightly as compared to the light incident on the diffusion plate DIF.

The light emerged from the diffusion plate DIF is incident on the illuminating optical system ILL. The illuminating optical system ILL is a collimating optical system.

Accordingly, collimated light is emerged from the illuminating optical system ILL.

Light incident on the illuminating optical system ILL becomes light which is diffused slightly. Accordingly, light emerged from the illuminating optical system ILL is diverged slightly. However, characteristics of collimated light are maintained virtually.

The optical axis AXILL is tilted with respect to an optical axis AXOBJ. Consequently, the light emerged from the illuminating optical system ILL travels to be inclined with respect to the optical axis AXOBJ. When the optical axis AXILL is extended, the optical axis AXILL intersects the optical axis AXOBJ on the object side of a plane parallel plate PL2. As a result, the light emerged from the illuminating optical system ILL comes closer to the optical axis AXOBJ, as moving away from the illuminating optical system ILL.

The light emerged from the illuminating optical system ILL is incident on the plane parallel plate PL2 (stage). Light incident on the plane parallel plate PL2 passes through the plane parallel plate PL2 and a plane parallel plate PL1 (bottom of the container), and is incident on a top plate (not shown in the diagram). A part of the light incident on the top plate is reflected at the top plate. Light reflected at the top plate comes closer to the optical axis AXOBJ, as moving closer to the plane parallel plate PL1.

The light reflected at the top plate is incident on the plane parallel plate PL1. Light incident on the plane parallel plate PL1 intersects the optical axis AXOBJ near a position of the plane parallel plate PL1. Accordingly, a field of view of the image forming optical system OBJ is illuminated.

The light reflected at the top plate illuminates the field of view of the image forming optical system OBJ from a direction inclined with respect to the optical axis AXOBJ. An object is positioned in the field of view of the image forming optical system OBJ. Accordingly, the object is subjected to oblique illumination. As a result, even when the object is transparent, an optical image of the object having a contrast is formed.

The optical image is formed on an image pickup element IM. The optical image is captured by the image pickup element IM. Accordingly, an image of the optical image is acquired. It is possible to acquire information of the object from the acquired image. The acquired image is subjected to processing by an image processing unit IP, according to the requirement. The information of the object may be acquired by using the image processing unit IP.

The light source LS is connected to a control unit CONT. The control unit CONT carries out a control of putting the light ON and OFF for each of the four LEDs. The four LEDs may be put ON and OFF simultaneously, or may not be put ON and OFF simultaneously.

In a case in which the four LEDs are put ON and OFF simultaneously, the object is illuminated by lights of a plurality of wavelengths. The information acquisition apparatus satisfies conditional expression (4), (5), and (6). Consequently, a slight longitudinal chromatic aberration occurs in the image forming optical system OBJ. Consequently, although information of a color of the object is acquired, an image of the object becomes an image lacking the sharpness to a certain degree.

In a case in which the four LEDs are not put ON and OFF simultaneously, putting the LED 1 ON and OFF, putting the LED 2 ON and OFF, putting the LED 3 ON and OFF, and putting the LED 4 ON and OFF, is carried out in an order that has been set in advance.

As a result, an optical image formed by the light of the wavelength $\lambda 1$, an optical image formed by the light of the wavelength $\lambda 2$, an optical image formed by the light of the wavelength $\lambda 3$, and an optical image formed by the light of the wavelength $\lambda 4$ are formed with a time lag on an image pickup surface of the image pickup element IM. A focus position differs for each of the four optical images.

Each of the four optical images is captured by the image pickup element IM. In this case, it is possible to capture the optical images with different focus positions independently for each wavelength. Accordingly, four images are acquired. The focus position differs for each of the four images. Accordingly, from the four images, it is possible to acquire information of a shape of the object and information of each of the overlapping objects.

The acquired images are subjected to processing by the image processing unit IP according to the requirement. For instance, by synthesizing the four images, an image having a deep focal depth is obtained.

Two LEDs may have been disposed at an outer side of the LED 1. In this case, the light of the wavelength $\lambda 3$ may be emitted from one of the two LEDs and the light of the wavelength $\lambda 4$ may be emitted from the other LED. The number of LEDs and the number of peak wavelengths is not restricted to four. An order in which the fourth wavelengths are to be arranged is also not restricted.

Figure 12:
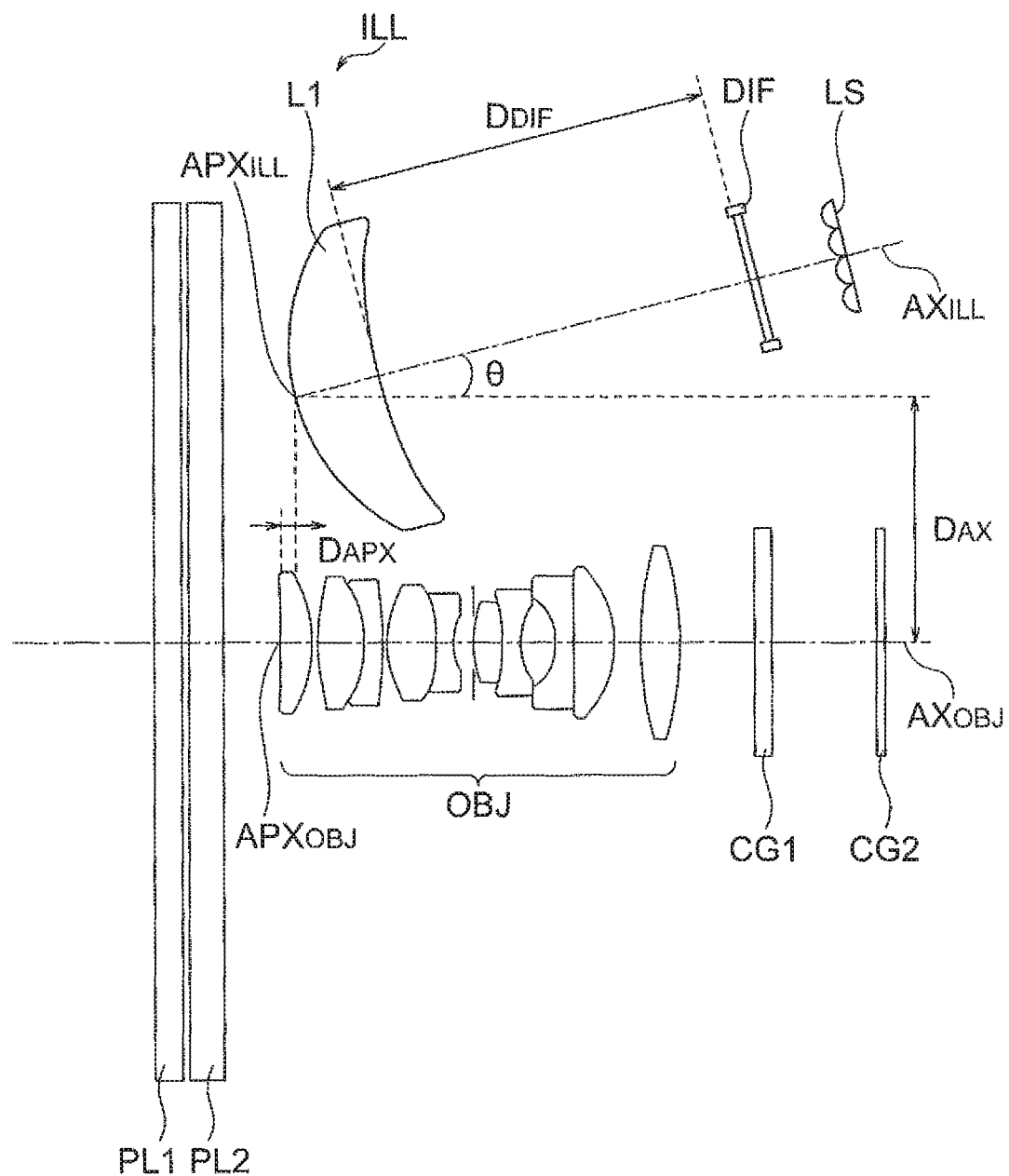
FIG. 12 is a lens cross-sectional view of a second example of the illuminating section.

An illuminating section of a second example, as shown in FIG. 12, includes a light source LS, a diffusion plate DIF, and an illuminating optical system ILL. The illuminating optical system ILL includes a positive meniscus lens L1 having a convex surface directed toward an object side. Same reference numerals are assigned to components same as that in the illuminating section of the first example, and description thereof is omitted. Moreover, a control unit CONT, an image pickup element IM, and an image processing unit IP are omitted in the diagram.

Each of the light source LS, the diffusion plate DIF, and the positive meniscus lens L1 is disposed on an optical axis AXILL. A lens apex APXILL is positioned on an image side of an apex APXOBJ. Both surfaces of the positive meniscus lens are aspheric surfaces.

Figure 13:
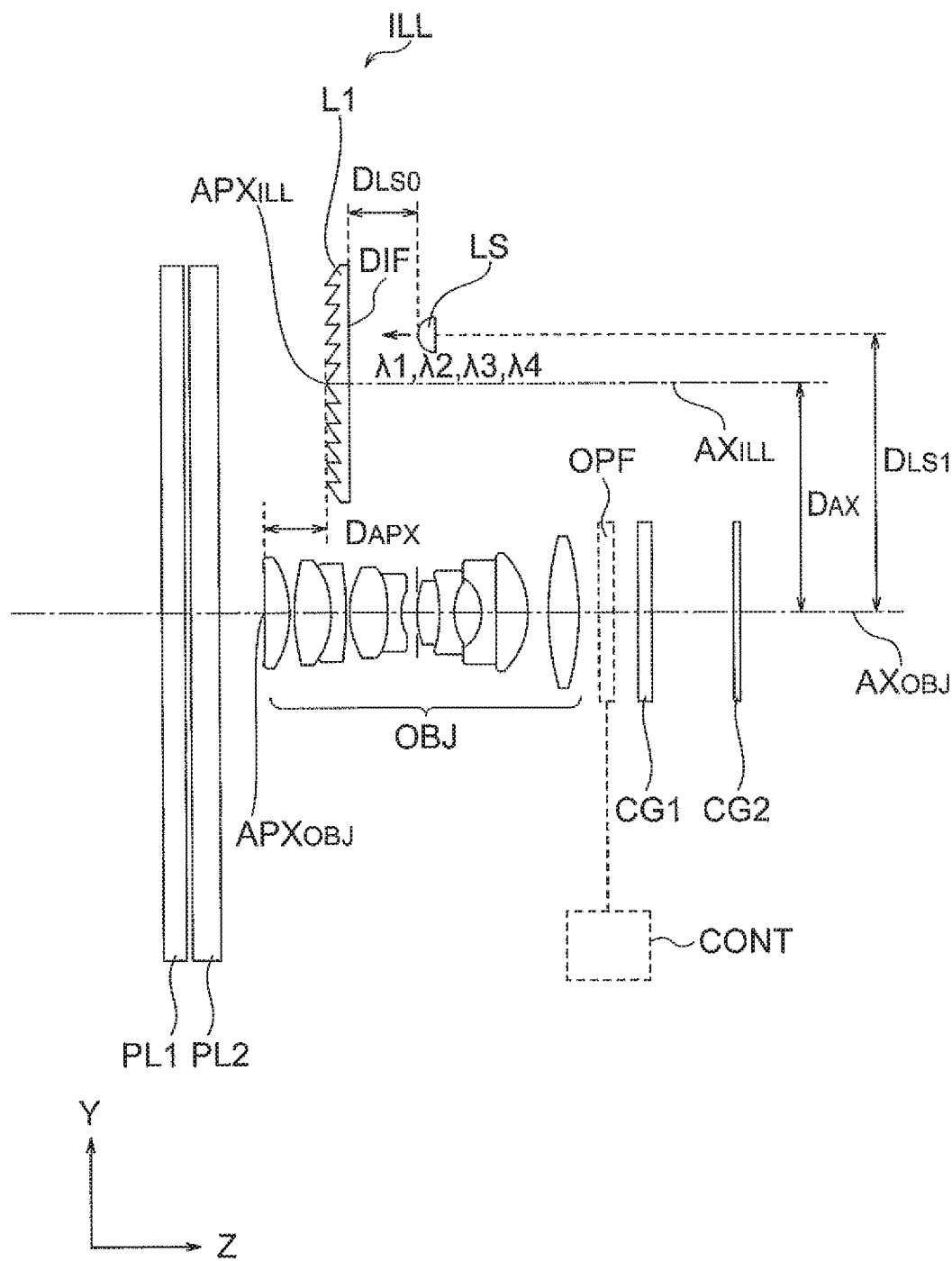
FIG. 13 is a lens cross-sectional view of a third example of the illuminating section.

An illuminating section of a third example, as shown in FIG. 13, includes a light source LS, a diffusion plate DIF, an illuminating optical system ILL, and a wavelength selection section OPF. The illuminating optical system ILL includes a Fresnel lens L1. Same reference numerals are assigned to components same as that in the illuminating section of the first example, and description thereof is omitted. Moreover, an image pickup element IM and an image processing unit IP are omitted in the diagram.

The light source LS is disposed at a position shifted with respect to the optical axis AXILL. A lens apex APXILL is positioned on an image side of an apex APXOBJ.

Ring-shaped steps are formed on an object-side surface of the Fresnel lens L1. A light-source side surface of the Fresnel lens L1 is a surface having a diffusion effect. An outer shape of the Fresnel lens L1 is rectangular. A length of a long side of the Fresnel lens L1 is 23.2 mm and a length of a short side of the Fresnel lens L1 is 19 mm. The long side of the Fresnel lens is parallel to a Y-axis.

The light source LS includes one LED. White light is emitted from the one LED. Light of a wavelength $\lambda 1$, light of a wavelength $\lambda 2$, light of a wavelength $\lambda 3$, and light of a wavelength $\lambda 4$ are included in the white light. The lights of the four wavelengths are emitted simultaneously from the light source LS.

An optical axis AXILL is shifted with respect to an optical axis AXOBJ. The light source LS is disposed at a position shifted with respect to the optical axis AXILL. Consequently, light emerged from the illuminating optical system ILL travels to be inclined with respect to the optical axis AXOBJ. As a result, the light emerged from the illuminating optical system ILL comes closer to the optical axis AXOBJ, as moving away from the illuminating optical system ILL.

The light emerged from the illuminating optical system ILL is reflected at a top plate. Light reflected at the top plate illuminates a field of view of an image forming optical system OBJ from a direction inclined with respect to the optical axis AXOBJ. Accordingly, an object is subjected to oblique illumination similarly as in the illuminating section of the first example and the illuminating section of the second example. As a result, even when the object is transparent, an optical image of the object having a contrast is formed.

As mentioned above, the lights of four wavelength are emitted simultaneously from the light source LS. Consequently, an optical image formed by the light of the wavelength $\lambda 1$, an optical image formed by the light of the wavelength $\lambda 2$, an optical image formed by the light of the wavelength $\lambda 3$, and an optical image formed by the light of the wavelength $\lambda 4$ are formed simultaneously on an image pickup surface of the image pickup element IM.

The optical images are formed on the image pickup surface of the image pickup element IM. The optical images are captured by the image pickup element IM. Accordingly, an image of the optical image is acquired. It is possible to acquire information of the object from the acquired image. The acquired image is subjected to processing by an image processing unit IP, according to the requirement. The information of the object may be acquired by using the image processing unit IP.

A focus position differs for each of the four optical images. When it is possible to capture independently each optical image for each wavelength, it is possible to acquire images for which the focus positions differ.

For instance, it is preferable to dispose the wavelength selection section OPF between the image forming optical system OBJ and a cover glass CG1. The wavelength selection section OPF includes an optical filter which allows the light of the wavelength $\lambda 1$ to pass through, an optical filter which allows the light of the wavelength $\lambda 2$ to pass through, an optical filter which allows the light of the wavelength $\lambda 3$ to pass through, and an optical filter which allows the light of the wavelength $\lambda 4$ to pass through. The four filters are formed of a color glass or an optical thin film.

The four optical filters are to be positioned in order between the light source LS and the diffusion plate DIF. The movement of the optical filters is to be carried out by a control unit CONT.

Accordingly, an optical image formed by the light of the wavelength $\lambda 1$, an optical image formed by the light of the wavelength $\lambda 2$, an optical image formed by the light of the wavelength $\lambda 3$, and an optical image formed by the light of the wavelength $\lambda 4$ are formed with a time lag on the image pickup surface of the image pickup element IM.

Each of the four optical images is captured by the image pickup element IM. Accordingly, four images are acquired. It is possible to acquire information of the object from the four acquired images. Moreover, by synthesizing the four images, an image having a deep focal depth is obtained.

Moreover, instead of using the wavelength selection section OPF, a plurality of LEDs may be used for the light source LS. Moreover, the wavelength selection section OPF may be disposed between alight source which emits white light and the diffusion plate DIF.

The diffusion plate DIF may have been integrated with the Fresnel lens L1 or may have been made of a member separate from the Fresnel lens L1. In a case in which the diffusion plate DIF is integrated with the Fresnel lens L1, it is preferable to let at least one of an object-side surface and an image-side surface of the Fresnel lens L1 to be an optical surface having a diffusion effect.

Moreover, in FIG. 13, a Fresnel lens surface is positioned on a plane parallel plate PL2 side and a diffusion surface is positioned on a light source LS side. However, the diffusion surface may be positioned on the plane parallel plate PL2 side and the Fresnel surface may be positioned on the light source LS side.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens, * denotes an aspherical surface, # denotes a Fresnel lens surface, and stop denotes an aperture stop.

Moreover, in Various data, f denotes a focal length of the entire optical system, NA denotes a object-side numerical aperture. A unit of angle is degree.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+ \ldots$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | ∞ | 1.85 | 1.80100 | 34.97 |
| 6 | −7.721 | 0.30 | | |
| 7 | 13.654 | 2.70 | 1.48749 | 70.23 |
| 8 | −6.252 | 0.01 | 1.56444 | 43.79 |
| 9 | −6.252 | 1.05 | 1.77250 | 49.60 |
| 10 | −18.169 | 0.35 | | |
| 11 | 5.595 | 2.36 | 1.80610 | 40.92 |
| 12 | −8.003 | 0.01 | 1.56444 | 43.79 |
| 13 | −8.003 | 1.05 | 1.80000 | 29.84 |
| 14 | 3.127 | 1.10 | | |
| 15 (Stop) | ∞ | 0.00 | | |
| 16 | 5.022 | 2.48 | 1.83481 | 42.73 |
| 17 | −5.022 | 0.01 | 1.56444 | 43.79 |
| 18 | −5.022 | 1.05 | 1.59270 | 35.31 |
| 19 | 3.348 | 2.00 | | |
| 20 | −3.127 | 1.05 | 1.59551 | 39.24 |
| 21 | ∞ | 0.01 | 1.56444 | 43.79 |
| 22 | ∞ | 2.50 | 1.77250 | 49.60 |
| 23 | −6.370 | 0.85 | | |
| 24 | 18.169 | 2.40 | 1.77250 | 49.60 |
| 25 | −18.169 | 4.04 | | |
| 26 | ∞ | 1.00 | 1.51633 | 64.14 |
| 27 | ∞ | 6.00 | | |
| 28 | ∞ | 0.50 | 1.51633 | 64.14 |
| 29 | ∞ | 0.00 | | |
| Image plane | ∞ | | | |

| Various data | |
|---|---|
| f | 31.97 |
| NA | 0.25 |

Example 2

| Unit mm | | | | |
|---|---|---|---|---|
| Surface data | | | | |
| Surface no. | r | d | nd | vd |
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | −111.215 | 1.85 | 1.78800 | 47.37 |
| 6 | −7.371 | 0.30 | | |
| 7 | 13.254 | 2.70 | 1.48749 | 70.23 |
| 8 | −6.137 | 1.05 | 1.77250 | 49.60 |
| 9 | −21.783 | 0.25 | | |
| 10 | 6.010 | 2.83 | 1.80400 | 46.58 |
| 11 | −4.373 | 1.05 | 1.80000 | 29.84 |
| 12 | 3.623 | 1.10 | | |
| 13 (Stop) | ∞ | 0.00 | | |
| 14 | 5.799 | 1.70 | 2.00330 | 28.27 |
| 15 | −9.657 | 1.05 | 1.59270 | 35.31 |
| 16 | 3.440 | 2.05 | | |
| 17 | −2.922 | 1.05 | 1.59551 | 39.24 |
| 18 | ∞ | 2.35 | 1.77250 | 49.60 |
| 19 | −6.044 | 1.47 | | |
| 20 | 19.103 | 2.25 | 1.75500 | 52.32 |
| 21 | −19.103 | 4.38 | | |
| 22 | ∞ | 1.00 | 1.51633 | 64.14 |
| 23 | ∞ | 6.00 | | |
| 24 | ∞ | 0.50 | 1.51633 | 64.14 |
| 25 | ∞ | 0.02 | | |
| Image plane | ∞ | | | |

| Various data | |
|---|---|
| f | 26.03 |
| NA | 0.25 |

Example 3

| Unit mm | | | | |
|---|---|---|---|---|
| Surface data | | | | |
| Surface no. | r | d | nd | vd |
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 5.28 | | |
| 5 | −97.311 | 3.00 | 1.88300 | 40.76 |
| 6 | −8.612 | 0.30 | | |
| 7 | 12.821 | 2.58 | 1.48749 | 70.23 |
| 8 | −6.949 | 0.01 | 1.56444 | 43.79 |
| 9 | −6.949 | 1.05 | 1.77250 | 49.60 |

-continued

Unit mm

| | | | | |
|---|---|---|---|---|
| 10 | −99.966 | 1.11 | | |
| 11 (Stop) | ∞ | 0.86 | | |
| 12 | 7.295 | 2.93 | 1.81600 | 46.62 |
| 13 | −4.098 | 0.01 | 1.56444 | 43.79 |
| 14 | −4.098 | 1.05 | 1.80000 | 29.84 |
| 15 | 4.324 | 0.59 | | |
| 16 | 5.511 | 3.04 | 2.00100 | 29.13 |
| 17 | 695.145 | 0.01 | 1.56444 | 43.79 |
| 18 | 695.145 | 1.05 | 1.59270 | 35.31 |
| 19 | 3.573 | 2.53 | | |
| 20 | −3.432 | 1.05 | 1.75211 | 25.05 |
| 21 | −5.431 | 1.06 | | |
| 22 | 22.877 | 2.01 | 2.00100 | 29.13 |
| 23 | −18.033 | 8.00 | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane | ∞ | | | |

Various data

| | |
|---|---|
| f | 10.60 |
| NA | 0.25 |

Example 4

Unit mm

Surface data

| Surface no. | r | d | nd | vd |
|---|---|---|---|---|
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | −24.288 | 1.60 | 1.88300 | 40.76 |
| 6 | −8.772 | 0.30 | | |
| 7 | 34.327 | 2.80 | 1.65844 | 50.88 |
| 8 | −6.100 | 0.01 | 1.56444 | 43.79 |
| 9 | −6.100 | 1.05 | 1.74320 | 49.34 |
| 10 | −36.654 | 7.01 | | |
| 11 | 12.204 | 3.23 | 1.81600 | 46.62 |
| 12 | ∞ | 0.00 | | |
| 13 (Stop) | ∞ | 0.90 | | |
| 14* | 7.785 | 2.57 | 1.58233 | 59.30 |
| 15* | −100.674 | 0.15 | | |
| 16 | 4.232 | 1.66 | 1.51633 | 64.14 |
| 17 | ∞ | 0.01 | 1.56444 | 43.79 |
| 18 | ∞ | 1.03 | 1.80610 | 40.92 |
| 19 | 2.406 | 2.00 | | |
| 20 | −3.423 | 1.05 | 1.60562 | 43.70 |
| 21 | ∞ | 2.38 | | |
| 22 | 12.224 | 3.10 | 1.84666 | 23.78 |
| 23 | −12.224 | 2.10 | | |
| 24 | ∞ | 0.50 | 1.51633 | 64.14 |
| 25 | ∞ | 0.00 | | |
| Image plane | ∞ | | | |

-continued

Unit mm

Aspherical surface data

14th surface k = −0.310
A4 = −7.53830e−05, A6 = 2.04460e−07, A8 = 8.44620e−09

15th surface k = 0.000
A4 = 1.21680e−04, A6 = 1.26200e−07, A8 = 6.43890e−09

Various data

| | |
|---|---|
| f | 16.86 |
| NA | 0.25 |

Example 5

Unit mm

Surface data

| Surface no. | r | d | nd | vd |
|---|---|---|---|---|
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | 23.088 | 1.71 | 1.88300 | 40.76 |
| 6 | −14.941 | 0.30 | | |
| 7 | 25.077 | 1.37 | 1.65844 | 50.88 |
| 8 | −380.487 | 0.01 | 1.56384 | 60.67 |
| 9 | −380.487 | 1.05 | 1.74320 | 49.34 |
| 10 | 6.692 | 4.11 | | |
| 11 | 19.443 | 2.10 | 1.81600 | 46.62 |
| 12 | −12.891 | 1.16 | | |
| 13(Stop) | ∞ | 0.45 | | |
| 14* | 7.785 | 2.57 | 1.58233 | 59.30 |
| 15* | −100.674 | 0.20 | | |
| 16 | 15.351 | 3.90 | 1.51633 | 64.14 |
| 17 | −83681.098 | 0.01 | 1.56384 | 60.67 |
| 18 | −83681.098 | 1.03 | 1.80440 | 39.59 |
| 19 | 3.873 | 4.43 | | |
| 20 | −3.165 | 1.05 | 1.60562 | 43.70 |
| 21 | 16.514 | 0.01 | 1.56384 | 60.67 |
| 22 | 16.514 | 2.87 | 1.69680 | 55.53 |
| 23 | −7.895 | 1.05 | | |
| 24 | 8.662 | 2.84 | 1.84666 | 23.78 |
| 25 | 116.129 | 2.43 | | |
| 26 | ∞ | 0.30 | 1.51633 | 64.14 |
| 27 | ∞ | 0.40 | | |
| 28 | ∞ | 0.50 | 1.51633 | 64.14 |
| 29 | ∞ | 0.53 | | |
| Image plane | ∞ | | | |

Aspherical surface data

14th surface k = −0.310
A4 = −7.53830e−05, A6 = 2.04460e−07, A8 = 8.44620e−09

15th surface k = 0.000
A4 = 1.21680e−04, A6 = 1.26200e−07, A8 = 6.43890e−09

Various data

| | |
|---|---|
| f | 90.54 |
| NA | 0.25 |

Example 6

Unit mm

Surface data

| Surface no. | r | d | nd | vd |
|---|---|---|---|---|
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.07 | | |
| 5 | 243.729 | 1.55 | 1.88300 | 40.76 |
| 6 | −9.112 | 0.30 | | |
| 7 | 9.365 | 2.20 | 1.48749 | 70.23 |
| 8 | −6.752 | 0.01 | 1.56444 | 43.79 |
| 9 | −6.752 | 1.05 | 1.77250 | 49.60 |
| 10 | −12.637 | 0.15 | | |
| 11* | 4.526 | 1.46 | 1.74320 | 49.29 |
| 12 | 4.739 | 0.01 | 1.56444 | 43.79 |
| 13 | 4.739 | 1.05 | 1.80000 | 29.84 |
| 14 | 3.050 | 1.00 | | |
| 15(Stop) | ∞ | 0.00 | | |
| 16 | 5.634 | 1.33 | 2.00100 | 29.13 |
| 17 | −154.706 | 0.01 | 1.56444 | 43.79 |
| 18 | −154.706 | 1.05 | 1.59270 | 35.31 |
| 19 | 3.357 | 2.73 | | |
| 20 | −2.620 | 1.05 | 1.59270 | 35.31 |
| 21 | −6.070 | 0.01 | 1.56444 | 43.79 |
| 22 | −6.070 | 2.62 | 1.85135 | 40.10 |
| 23* | −5.530 | 0.10 | | |
| 24 | 21.919 | 2.59 | 2.00100 | 29.13 |
| 25 | −19.005 | 6.93 | | |
| 26 | ∞ | 0.50 | 1.51633 | 64.14 |
| 27 | ∞ | 0.03 | | |
| Image plane | ∞ | | | |

Aspherical surface data

11th surface k = 0.000
A4 = −2.04052e−04, A6 = −1.74659e−05

23rd surface k = 0.000
A4 = −1.89384e−05, A6 = −2.62803e−07

Various data

| f | 78.82 |
|---|---|
| NA | 0.25 |

Example 7

Unit mm

Surface data

| Surface no. | r | d | nd | vd |
|---|---|---|---|---|
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | −17.116 | 1.45 | 1.88300 | 40.76 |
| 6 | −9.467 | 0.30 | | |
| 7 | −80.677 | 2.50 | 1.48749 | 70.23 |
| 8 | −4.282 | 0.01 | 1.56444 | 43.79 |
| 9 | −4.282 | 1.05 | 1.77250 | 49.60 |
| 10 | −11.259 | 1.20 | | |
| 11* | 7.039 | 2.42 | 1.74320 | 49.29 |
| 12* | −11.266 | 0.54 | | |
| 13(Stop) | ∞ | 0.17 | | |
| 14 | 5.246 | 1.53 | 1.48749 | 70.23 |
| 15 | 10.457 | 0.01 | 1.56444 | 43.79 |
| 16 | 10.457 | 1.03 | 1.80518 | 25.42 |
| 17 | 2.683 | 1.80 | | |
| 18* | −2.331 | 1.05 | 1.51633 | 64.14 |
| 19* | −5.902 | 0.29 | | |
| 20 | 76.798 | 1.74 | 2.00100 | 29.13 |
| 21 | −9.413 | 10.59 | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | 0.50 | | |
| Image plane | ∞ | | | |

Aspherical surface data

11th surface k = 0.000
A4 = −4.05643e−04, A6 = 1.38859e−06

12th surface k = 0.000
A4 = 4.96446e−04, A6 = 1.13439e−06

18th surface k = 0.000
A4 = 1.24638e−02, A6 = 1.93545e−04

19th surface k = 0.000
A4 = 5.80707e−03, A6 = −4.19952e−04

Various data

| f | 7.23 |
|---|---|
| NA | 0.25 |

Example 8

Unit mm

Surface data

| Surface no. | r | d | nd | vd |
|---|---|---|---|---|
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 6.34 | | |
| 5 | 17.668 | 3.00 | 1.48749 | 70.23 |
| 6 | −12.943 | 1.20 | | |
| 7* | 6.989 | 2.93 | 1.74320 | 49.29 |
| 8* | 78.924 | 0.10 | | |
| 9 | 6.777 | 2.61 | 1.77250 | 49.60 |
| 10 | 4.943 | 1.84 | | |
| 11(Stop) | ∞ | 1.40 | | |
| 12* | −5.968 | 1.03 | 1.80610 | 40.92 |
| 13* | 17.508 | 1.90 | | |
| 14 | −4.004 | 1.48 | 1.77250 | 49.60 |
| 15 | −5.207 | 0.30 | | |
| 16 | 89.963 | 2.25 | 2.00100 | 29.13 |
| 17 | −10.187 | 9.99 | | |

-continued

| | Unit mm | | | |
|---|---|---|---|---|
| 18 | ∞ | 0.30 | 1.51633 | 64.14 |
| 19 | ∞ | 0.40 | | |
| 20 | ∞ | 0.50 | 1.51633 | 64.14 |
| 21 | ∞ | 0.50 | | |
| Image plane | ∞ | | | |

Aspherical surface data

7th surface k = 0.000
A4 = 2.35800e−05, A6 = 1.05549e−06

8th surface k = 0.000
A4 = 5.10654e−04, A6 = −2.06296e−06

12th surface k = 0.000
A4 = −5.37040e−03, A6 = 1.55899e−04

13th surface k = 0.000
A4 = −1.11504e−03, A6 = 2.63198e−04

Various data

| f | 16.04 |
|---|---|
| NA | 0.25 |

Example 9

| | Unit mm | | | |
|---|---|---|---|---|
| Surface no. | r | d | nd | vd |
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | −28.604 | 1.60 | 1.88300 | 40.76 |
| 6 | −7.975 | 0.30 | | |
| 7 | 19.120 | 2.80 | 1.65844 | 50.88 |
| 8 | −6.260 | 1.05 | 1.74320 | 49.34 |
| 9 | ∞ | 5.16 | | |
| 10 | 12.240 | 1.50 | 1.77250 | 49.60 |
| 11 | ∞ | 0.30 | | |
| 12 | ∞ | 0.70 | 1.51633 | 64.14 |
| 13(Stop) | ∞ | 0.70 | 1.51633 | 64.14 |
| 14 | ∞ | 0.45 | | |
| 15* | 7.785 | 2.57 | 1.58233 | 59.30 |
| 16* | −100.674 | 0.20 | | |
| 17 | 4.315 | 1.76 | 1.51633 | 64.14 |
| 18 | ∞ | 1.04 | 1.80440 | 39.59 |
| 19 | 2.347 | 1.89 | | |
| 20 | −3.099 | 1.05 | 1.60562 | 43.70 |
| 21 | ∞ | 1.94 | 1.69680 | 55.53 |
| 22 | −15.194 | 2.85 | | |
| 23 | 17.970 | 4.31 | 1.84666 | 23.78 |
| 24 | −12.226 | 0.80 | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.53 | | |
| Image plane | ∞ | | | |

-continued

| Unit mm |
|---|

Aspherical surface data

15th surface k = −0.310
A4 = −7.53830e−05, A6 = 2.04460e−07, A8 = 8.44620e−09

16th surface k = 0.000
A4 = 1.21680e−04, A6 = 1.26200e−07, A8 = 6.43890e−09

Various data

| f | 1275.99 |
|---|---|
| NA | 0.25 |

Example 10

| | Unit mm | | | |
|---|---|---|---|---|
| Surface no. | r | d | nd | vd |
| 1 | ∞ | 1.00 | 1.52287 | 59.89 |
| 2 | ∞ | 1.00 | | |
| 3 | ∞ | 2.00 | 1.52287 | 59.89 |
| 4 | ∞ | 3.30 | | |
| 5 | −14.459 | 3.00 | 1.88300 | 40.76 |
| 6 | −6.765 | 0.30 | | |
| 7 | 16.543 | 2.60 | 1.48749 | 70.23 |
| 8 | −6.041 | 0.01 | 1.56444 | 43.79 |
| 9 | −6.041 | 1.05 | 1.77250 | 49.60 |
| 10 | −26.610 | 1.12 | | |
| 11(Stop) | ∞ | 0.85 | | |
| 12 | 7.577 | 2.76 | 1.81600 | 46.62 |
| 13 | −4.107 | 0.01 | 1.56444 | 43.79 |
| 14 | −4.107 | 1.05 | 1.80000 | 29.84 |
| 15 | 4.336 | 0.20 | | |
| 16 | 4.853 | 3.11 | 2.00100 | 29.13 |
| 17 | −49.621 | 0.01 | 1.56444 | 43.79 |
| 18 | −49.621 | 1.05 | 1.59270 | 35.31 |
| 19 | 3.422 | 2.71 | | |
| 20 | −3.301 | 1.05 | 1.80810 | 22.76 |
| 21 | −4.977 | 0.20 | | |
| 22 | 26.146 | 1.97 | 2.00100 | 29.13 |
| 23 | −14.953 | 10.81 | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.50 | | |
| Image plane | ∞ | | | |

Various data

| f | 9.50 |
|---|---|
| NA | 0.25 |

Example A (Illuminating Optical System of the Illuminating Section of the First Example)

Unit mm

Surface data

| Surface no. | r | d | nd | νd |
|---|---|---|---|---|
| 1 | 14.783 | 4.00 | 1.73400 | 51.47 |
| 2 | ∞ | 3.26 | | |
| 3 | −23.267 | 1.05 | 1.51633 | 64.14 |
| 4 | ∞ | | | |

Various data

| f | 29.910 |
|---|---|
| DDIF | 21.04 |
| θ | 14.0 |
| DAPX | 0.19 |
| DAX | 13.35 |

Example B (Illuminating Optical System of the Illuminating Section of the Second Example)

Unit mm

Surface data

| Surface no. | r | d | nd | νd |
|---|---|---|---|---|
| 1* | 43.550 | 5.00 | 1.52542 | 55.78 |
| 2* | 12.000 | | | |

Aspherical surface data

1st surface k = 0.000
A4 = 3.52190e−05, A6 = 2.28100e−06

2nd surface k = 0.000
A4 = −6.35150e−05, A6 = 2.94430e−06, A8 = −3.32750e−08, A10 = 2.25200e−10

Various data

| f | 30.00 |
|---|---|
| DDIF | 25.71 |
| θ | 14.0 |
| DAPX | 0.835 |
| DAX | 13.75 |

Example C (Illuminating Optical System of the Illuminating Section of the Third Example)

Unit mm

Surface data

| Surface no. | r | d | nd | νd |
|---|---|---|---|---|
| 1# | ∞ | 2.00 | 1.49 | 58.00 |
| 2 | ∞ | | | |

-continued

Unit mm

Various data

| f | 10.00 |
|---|---|
| DLS0 | 10 |
| DLS1 | 19.5 |
| DAPX | 0.935 |
| DAX | 17 |

Next, values of conditional expressions in each example are given below.

| | Example1 | Example2 | Example3 | Example4 |
|---|---|---|---|---|
| (1)βd | −2.20 | −2.20 | −2.26 | −2.17 |
| (2)TL/|ENPL| | −0.02 | −0.05 | 2.08 | −0.02 |
| (3)TL/|EXPL| | −0.49 | −0.61 | −1.00 | −0.89 |
| (4)|ΔCd|/Sim$^{1/2}$ | 0.004 | 0.001 | 0.009 | 0.020 |
| (5)|ΔdF|/Sim$^{1/2}$ | 0.050 | 0.050 | 0.057 | 0.151 |
| (6)|ΔCF|/|ΔCd| | 13.56 | 37.68 | 7.52 | 8.36 |
| (7)|ΔSAd|/|ΔCF| | 0.07 | 0.09 | 0.26 | 0.03 |
| (8)|ΔSAC|/|ΔCF| | 0.06 | 0.15 | 0.12 | 0.06 |
| (9)|ΔSAF|/|ΔCF| | 0.07 | 0.22 | 1.05 | 0.07 |

| | Example5 | Example6 | Example 7 | Example8 |
|---|---|---|---|---|
| (1)βd | −2.21 | −2.19 | −2.17 | −2.18 |
| (2)TL/|ENPL| | 1.37 | 0.35 | 2.07 | −0.28 |
| (3)TL/|EXPL| | 0.13 | −0.07 | −1.42 | −0.95 |
| (4)|ΔCd|/Sim$^{1/2}$ | 0.041 | 0.007 | 0.028 | 0.040 |
| (5)|ΔdF|/Sim$^{1/2}$ | 0.212 | 0.133 | 0.112 | 0.205 |
| (6)|ΔCF|/|ΔCd| | 6.24 | 20.31 | 4.98 | 6.08 |
| (7)|ΔSAd|/|ΔCF| | 0.05 | 0.05 | 0.10 | 0.03 |
| (8)|ΔSAC|/|ΔCF| | 0.05 | 0.04 | 0.09 | 0.05 |
| (9)|ΔSAF|/|ΔCF| | 0.19 | 0.10 | 0.44 | 0.15 |

| | Example9 | Example10 |
|---|---|---|
| (1)βd | −2.91 | −2.30 |
| (2)TL/|ENPL| | 0.00 | 2.83 |
| (3)TL/|EXPL| | 0.02 | −1.08 |
| (4)|ΔCd|/Sim$^{1/2}$ | 0.030 | 0.020 |
| (5)|ΔdF|/Sim$^{1/2}$ | 0.225 | 0.052 |
| (6)|ΔCF|/|ΔCd| | 8.51 | 3.56 |
| (7)|ΔSAd|/|ΔCF| | 0.02 | 0.22 |
| (8)|ΔSAC|/|ΔCF| | 0.01 | 0.10 |
| (9)|ΔSAF|/|ΔCF| | 0.09 | 0.91 |

Values of parameters are given below. The unit of wavelength is nm and the unit of parameters other than wavelength is mm.

| | Example1 | Example2 | Example3 | Example4 |
|---|---|---|---|---|
| TL | 34.68 | 34.85 | 33.95 | 33.46 |
| ENPL | −2179.92 | −769.63 | 16.34 | −1561.98 |
| EXPL | −71.37 | −57.25 | −33.82 | −37.49 |
| Sim$^{1/2}$ | 5.425 | 5.425 | 5.425 | 5.425 |
| ΔCd | 0.022 | 0.007 | 0.048 | 0.111 |
| ΔdF | 0.273 | 0.271 | 0.311 | 0.818 |
| ΔCF | 0.294 | 0.279 | 0.358 | 0.929 |
| ΔSAd | 0.021 | 0.024 | 0.095 | 0.025 |
| ΔSAC | 0.019 | 0.042 | 0.044 | 0.052 |
| ΔSAF | 0.020 | 0.062 | 0.377 | 0.062 |
| λ1 | 630 | 630 | 630 | 630 |
| λ2 | 700 | 700 | 700 | 700 |
| λ3 | 570 | 570 | 570 | 570 |
| λ4 | 500 | 500 | 500 | 500 |

| | Example5 | Example6 | Example7 | Example8 |
|---|---|---|---|---|
| TL | 36.02 | 27.72 | 29.38 | 31.71 |
| ENPL | 26.31 | 78.57 | 14.19 | −111.70 |

-continued

|      | | | |      |
|------|--------|--------|--------|--------|
| EXPL | 286.77 | −411.98 | −20.69 | −33.44 |
| Sim$^{1/2}$ | 5.425 | 5.425 | 5.425 | 5.425 |
| ΔCd | 0.220 | 0.037 | 0.152 | 0.219 |
| ΔdF | 1.152 | 0.720 | 0.606 | 1.113 |
| ΔCF | 1.372 | 0.758 | 0.758 | 1.331 |
| ΔSAd | 0.068 | 0.041 | 0.075 | 0.036 |
| ΔSAC | 0.064 | 0.030 | 0.070 | 0.065 |
| ΔSAF | 0.266 | 0.073 | 0.337 | 0.205 |
| λ1 | 630 | 630 | 630 | 630 |
| λ2 | 700 | 700 | 700 | 700 |
| λ3 | 570 | 570 | 570 | 570 |
| λ4 | 500 | 500 | 500 | 500 |

|      | Example9 | Example10 |
|------|----------|-----------|
| TL   | 34.35    | 35.47     |
| ENPL | 26858.01 | 12.54     |
| EXPL | 2258.46  | −32.80    |
| Sim$^{1/2}$ | 5.425 | 5.425 |
| ΔCd  | 0.162    | 0.110     |
| ΔdF  | 1.220    | 0.280     |
| ΔCF  | 1.382    | 0.390     |
| ΔSAd | 0.027    | 0.087     |
| ΔSAC | 0.019    | 0.040     |
| ΔSAF | 0.127    | 0.353     |
| λ1   | 630      | 630       |
| λ2   | 700      | 700       |
| λ3   | 570      | 570       |
| λ4   | 500      | 500       |

Figure 14:
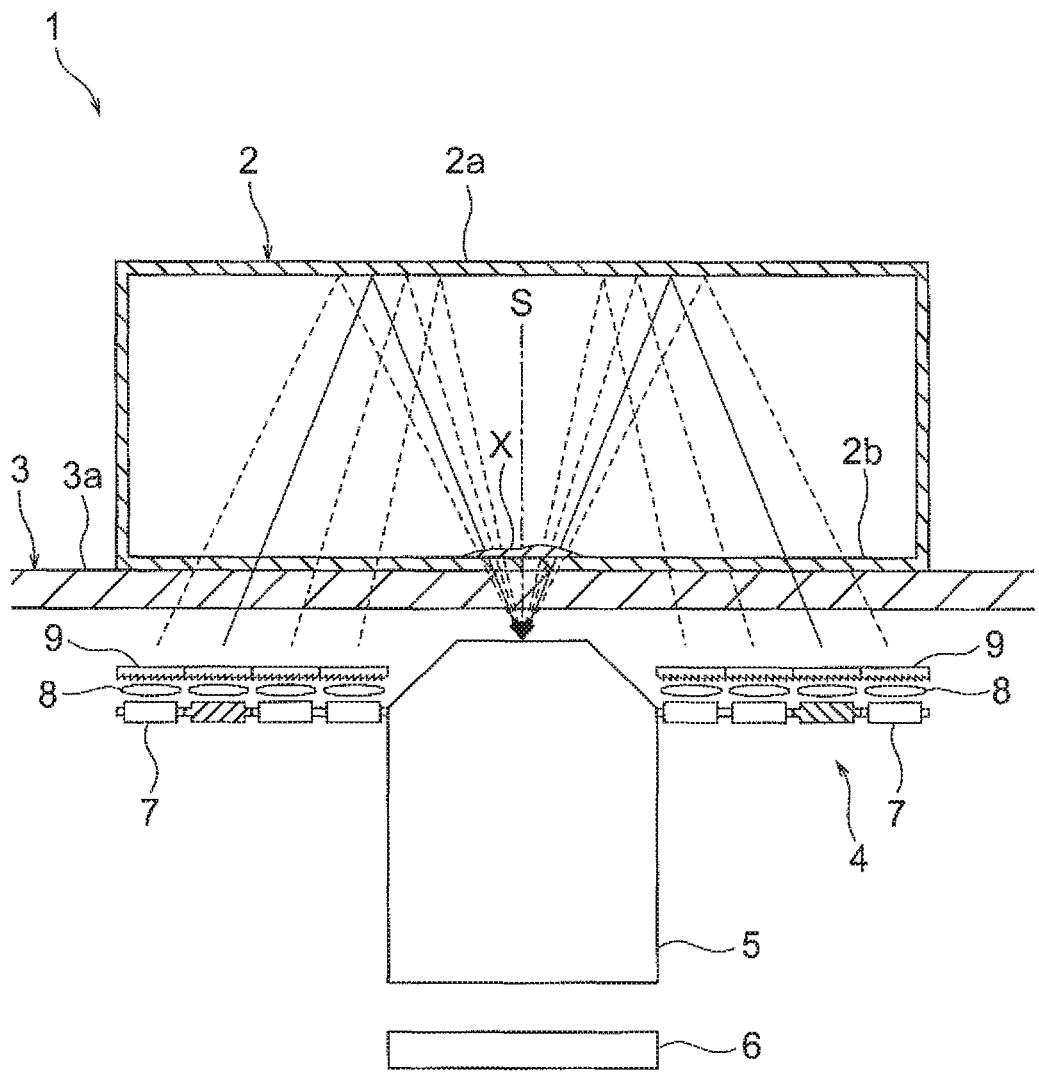
FIG. 14 is a cross-sectional view of an information acquisition apparatus.
Figure 15:
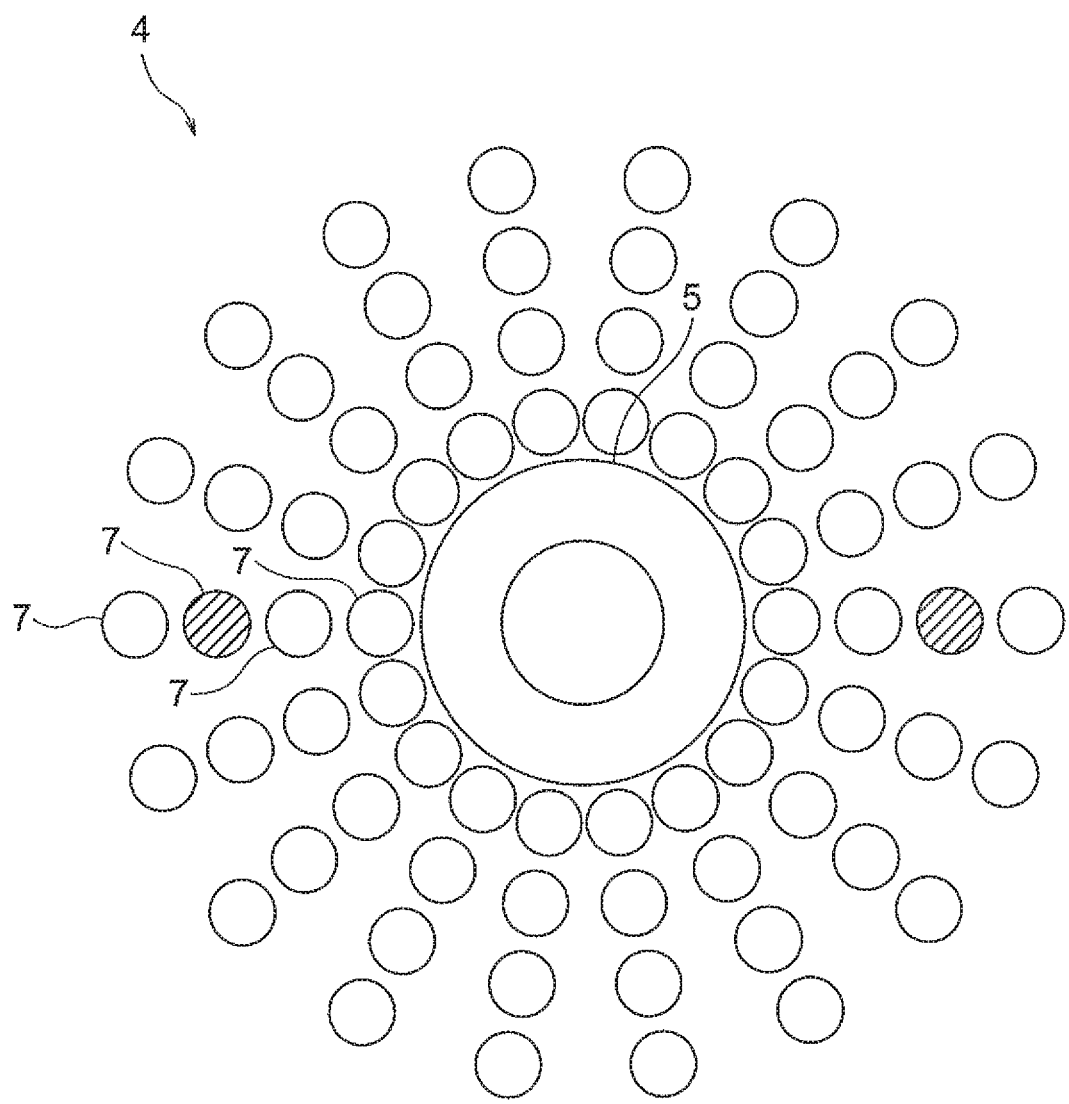
FIG. 15 is a diagram showing an arrangement of a light source.

FIG. 14 is a partial vertical cross-sectional view of the information acquisition apparatus of the present embodiment. FIG. 15 is a diagram showing an arrangement of a light source.

The information acquisition apparatus 1 includes a stage 3, an illuminating section 4, an image forming optical system 5, and an image pickup element 6.

A container 2 is placed on the stage 3. A sample X is accommodated in the container 2. The illuminating section 4 emits illumination light toward the stage 3. The image forming optical system 5 focuses light arriving upon being transmitted through the stage 3. An optical image of the sample X is formed at a focused position. The image pickup element 6 captures the optical image of the sample X.

The illuminating section 4, the image forming optical system 5, and the image pickup element 6 are disposed at a lower side of the stage 3. The illuminating section 4 is disposed at an outer side in a radial direction of the image forming optical system 5.

An optically transparent material such as a glass plate is used for the stage 3. The stage 3 covers an upper side of the illuminating section 4 and an upper side of the image forming optical system 5. The container 2, for instance, is a cell-culture flask having a top plate 2a. The container 2 is formed of an optically transparent resin.

The illuminating section 4 includes an LED 7, a focusing lens 8, and a diffusion plate 9. The focusing lens 8 is positioned at an upper side of the LED 7. The diffusion plate 9 is positioned at an upper side of the focusing lens.

Illumination light is emitted from the LED 7. The focusing lens 8 focuses the illumination light. The diffusion plate 9 diffuses illumination light that has been focused.

As shown in FIG. 15, a plurality of the LEDs 7 is disposed around the image forming optical system 5. The LEDs 7 are disposed in a form of rings to be directed toward an outer side from the image forming optical system 5. Moreover, the same number of focusing lenses 8 and the same number of diffusion plates 9 as the number of LEDs 7 are disposed similarly as the LEDs 7.

In the illuminating section 4, it is possible to put ON and OFF a specific LED 7 independently. In FIG. 14 and FIG. 15, the LEDs 7 that are ON, are shown by hatching.

Illumination light emitted from the LEDs 7 shown by hatching is transmitted as shown by solid lines, to be inclined upward and downward through the stage 3 and a bottom 2b of the container 2. The illumination light is reflected at a surface on an inner side of the top plate 2a. At this time, the illumination light is reflected toward the image forming optical system 5. Accordingly, the illumination light is irradiated to the sample X positioned within a field of view of the image forming optical system 5.

Even when the LED 7 to be put ON is changed to another LED 7, the illumination light, after being reflected at the surface on the inner side of the top plate, is reflected toward the image forming optical system 5 as shown by the broken lines. Moreover, similar to the illumination light shown by the solid lines, the illumination light is irradiated to the sample X positioned in the field of view of the image forming optical system 5.

When the sample X is subjected to oblique illumination, an angle of a light ray emerged from the sample X varies. As the angle of the light ray emerged from the sample X varies, a quantity of light passing through an aperture stop of the image forming optical system 5 varies. As a result, even when the sample X is transparent, an optical image having a contrast, or in other words, an optical image having a shadow is formed.

A direction in which the shadow is developed and a size of the shadow vary according to an angle of inclination of a surface of the sample X and an angle of irradiation of the illumination light. In the information acquisition apparatus 1, by changing the LED 7 that is to be put ON, the angle of irradiation of the illumination light varies. Consequently, when the LED 7 to be put ON is changed, the direction in which the shadow is developed and the size of the shadow vary. Accordingly, by changing the LED to be put ON in accordance with the sample X, it is possible to form an optical image having the most appropriate shadow.

The information acquisition apparatus 1 satisfies conditional expressions (4), (5), and (6). Therefore, slight longitudinal chromatic aberration occurs in the image forming optical system 5. In a case in which all the LEDs 7 are white-light diodes, although information of a color of the sample X is acquired, an image of the sample X becomes an image lacking the sharpness to a certain degree.

Therefore, a monochromatic LED is to be used for all the LEDs 7. In a monochromatic LED, a wavelength of light which is emitted is restricted. Moreover, the wavelength band is let to be same for all LEDs. By making such arrangement, it is possible to suppress degradation of an image due to the longitudinal chromatic aberration.

A plurality of monochromatic LEDs of different wavelength bands may be used. For instance, all the LEDs 7 may be grouped in to LEDs of three colors or four colors. By simultaneously putting ON and OFF the LEDs which emit light of same wavelength band, it is possible to capture optical images with different focus positions independently for each wavelength band. As a result, it is possible to acquire images with different focus positions independently for each wavelength band.

The focus position differs for each of the plurality of images. Accordingly, from the plurality of images, it is possible to acquire information of a shape of the sample X. Moreover, by synthesizing the plurality of images, an image having a deep focal depth is obtained.

In the image acquisition apparatus 1, no movement of a lens in the image forming optical system or no integral movement of the image forming optical 5 and the image pickup element 6 occurs. Therefore, size of the apparatus does not become large, and it is possible to suppress generation of vibrations or generation of heat.

Figure 16:
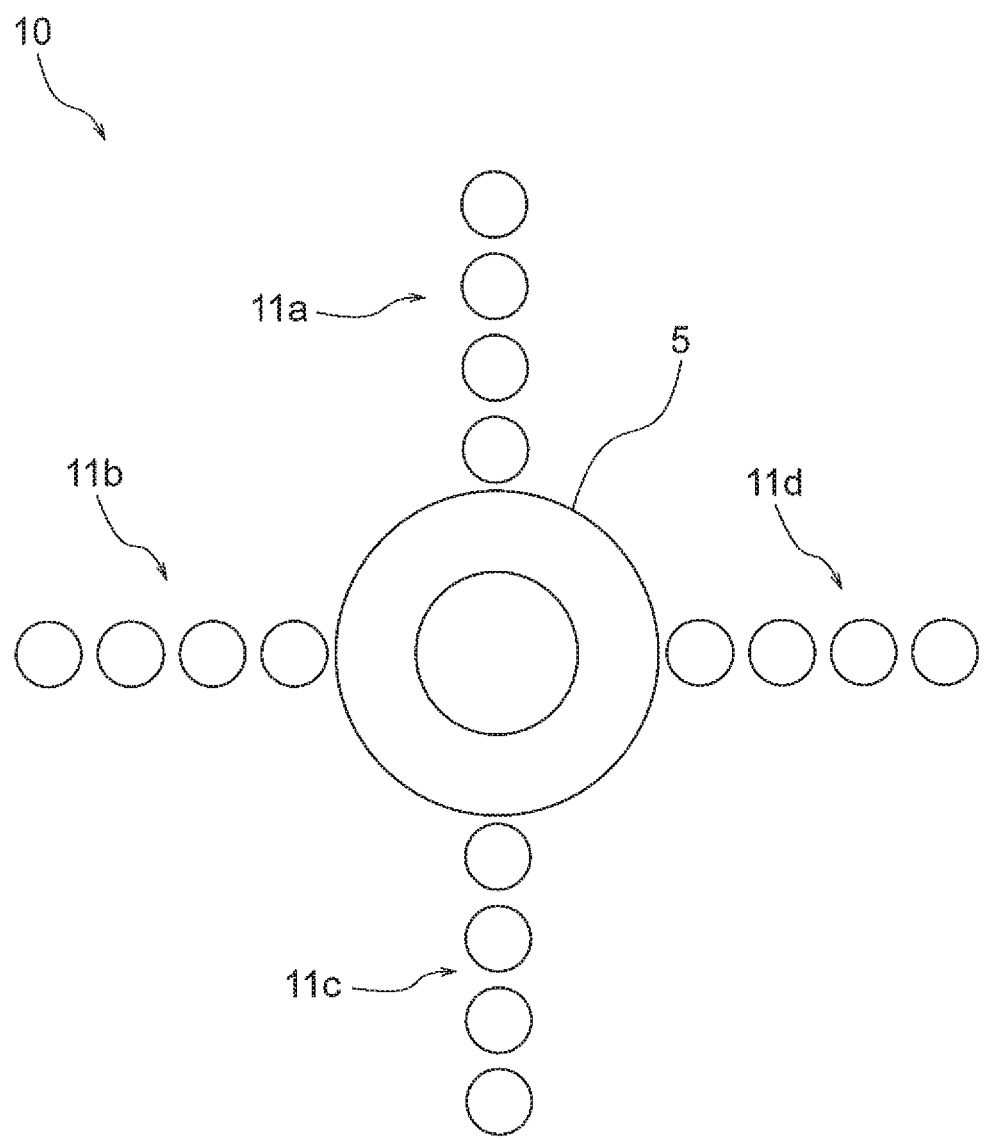
FIG. 16 is a diagram showing another example of the arrangement of a light source.

FIG. 16 is a diagram showing another example of the arrangement of the light source. In an illuminating section 10, a light source includes a first LED group 11a, a second LED group 11b, a third LED group 11c, and a fourth LED group 11d. The four LED group are arranged in two directions which are orthogonal.

By making such arrangement, it is possible to illuminate the entire field of view of the image forming optical system 5 while making the illuminating section 10 simple. In other words, it is possible to irradiate the illumination light to the entire sample X.

An arrangement may be made to illuminate by the first LED group 11a and the third LED group 11c only, or to illuminate by the second LED group 11b and the fourth LED group 11d only. By making such arrangement, it is possible to reduce cost and to simplify the apparatus.

The object of the information acquisition apparatus of the present embodiment is an industrial component or a culture cell for example. For the industrial component, the information acquisition apparatus of the present embodiment is used for observation and testing. For the culture cell, the information acquisition apparatus of the present embodiment is used for an observation and measurement. The present invention may have various modified examples without departing from the scope of the present invention.

According to the present embodiment, is it possible to provide an information acquisition apparatus which is compact while having a high performance.

As described heretofore, the present invention is suitable for an information acquisition apparatus which is compact while having a high performance.

What is claimed is:

1. An information acquisition apparatus, comprising:
an illuminating section;
an image forming optical system configured to form an image of an object; and
an image pickup element,
wherein:
the illuminating section includes a light source and an illuminating optical system, and
an image pickup surface of the image pickup element is positioned on an image plane of the image forming optical system, and
the image forming optical system includes in order from an object side, an incidence-side lens unit having a positive refractive power, an aperture section, and an emergence-side lens unit having a positive refractive power, and
an entrance pupil and an exit pupil are formed by the incidence-side lens unit, the aperture section, and the emergence-side lens unit, and
the incidence-side lens unit includes a plurality of positive lenses and at least one negative lens, and
the emergence-side lens unit includes a plurality of positive lenses and at least one negative lens, and
the following conditional expressions (1), (2), (3), (4), (5), (6), (7), (8), and (9) are satisfied:

$$-6 < \beta d < -0.8 \quad (1)$$

$$-0.5 < TL/|ENPL| < 3.0 \quad (2)$$

$$-1.5 < TL/|EXPL| < 0.5 \quad (3)$$

$$0.001 < |\Delta Cd|/Sim^{1/2} < 0.05 \quad (4)$$

$$0.04 < |\Delta dF|/Sim^{1/2} < 0.28 \quad (5)$$

$$3.5 < |\Delta CF|/|\Delta Cd| < 38.0 \quad (6)$$

$$0 < |\Delta SAd|/|\Delta CF| < 0.27 \quad (7)$$

$$0 < |\Delta SAC|/|\Delta CF| < 0.16 \quad (8)$$

$$0 < |\Delta SAF|/|\Delta CF| < 1.1 \quad (9)$$

where,
βd denotes a lateral magnification of the image forming optical system for a d-line,
TL denotes a distance in the image forming optical system between (i) an optical surface positioned to be nearest to the object and (ii) the image plane,
ENPL denotes a distance in the image forming optical system from (i) a lens surface positioned to be nearest to the object to (ii) the entrance pupil,
EXPL denotes a distance in the image forming optical system from (i) a lens surface positioned to be nearest to the image to be formed by the image forming optical system to (ii) the exit pupil,
ΔCd denotes a difference between an image forming position for the d-line and an image forming position for a C-line,
ΔdF denotes a difference between the image forming position for the d-line and an image forming position for an F-line,
ΔCF denotes a difference between the image forming position for the C-line and the image forming position for the F-line,
Sim denotes an area of an effective image pickup area on the image pickup surface,
ΔSAd denotes the maximum amount of a spherical aberration for the d-line,
ΔSAC denotes the maximum amount of a spherical aberration for the C-line,
ΔSAF denotes the maximum amount of a spherical aberration for the F-line,
the distance is a distance for the d-line,
the image forming position is an image position by a paraxial light ray, and
the distance and the difference are a distance on the optical axis and a difference on the optical axis, respectively.

2. The information acquisition apparatus according to claim 1, comprising:
a transparent stage,
wherein:
the object is positioned on one side of the stage, and
the illuminating section, the image forming optical system, and the image pickup element are disposed on the other side of the stage with respect to the object, and
the illuminating optical system includes a collimating optical system, and collimated light is generated by the collimating optical system, and
an optical axis of the illuminating optical system is decentered with respect to an optical axis of the image forming optical system.

3. The information acquisition apparatus according to claim 2, wherein the following conditional expression (10) is satisfied:

$$1.6 < Sco/Sen < 20.0 \quad (10)$$

where,
Sco denotes a cross-sectional area of a light beam emitted from the illuminating section, and
Sen denotes an area of a surface of incidence of the image forming optical system.

4. The information acquisition apparatus according to claim 1, wherein an optical surface having a diffusion effect is disposed in the illuminating section.

5. The information acquisition apparatus according to claim 1, wherein
a plurality of optical images is formed with a time lag on the image pickup surface, and
each of the plurality of optical images is formed by light having a restricted wavelength band, and
a wavelength for which a light intensity is the maximum in the wavelength band, differs for each of the plurality of optical images.

6. The information acquisition apparatus according to claim 5, comprising:
a control unit; and
a plurality of the light sources, wherein
the control unit carries out a control of switching light ON and OFF for each of the plurality of light sources, and
the number of light sources is same as a multiple of the plurality of optical images, and
each of the plurality of light sources emits light of a restricted wavelength band, and
a wavelength band of light which forms the optical image and a wavelength band of light which is emitted from the light source correspond one-to-one.

7. The information acquisition apparatus according to claim 5, comprising:
a control unit; and
a plurality of optical filters, wherein
the control unit carries out a control of putting each of the plurality of optical filters in and out of an optical path, and
light emitted from the light source includes all lights of wavelength bands forming the plurality of optical images, and
each of the plurality of optical filters allows light of a restricted wavelength to be transmitted through, and
a wavelength band of light which forms the optical image and a wavelength band of light which is emerged from the optical filter correspond one-to-one.

8. The information acquisition apparatus according to claim 5, wherein the four optical images are formed.

9. The information acquisition apparatus according to claim 8, wherein
a first optical image, a second optical image, a third optical image, and a fourth optical image are formed, and
the following conditional expressions (11), (12), (13), and (14) are satisfied:

$$600 \text{ nm} < \lambda 1 < 650 \text{ nm} \tag{11}$$

$$50 \text{ nm} < \lambda 2 - \lambda 1 < 300 \text{ nm} \tag{12}$$

$$-200 \text{ nm} < \lambda 3 - \lambda 1 < -50 \text{ nm} \tag{13}$$

$$-200 \text{ nm} < \lambda 4 - \lambda 3 < -50 \text{ nm} \tag{14}$$

where,
$\lambda 1$ denotes a peak wavelength in the first optical image,
$\lambda 2$ denotes a peak wavelength in the second optical image,
$\lambda 3$ denotes a peak wavelength in the third optical image, and
$\lambda 4$ denotes a peak wavelength in the fourth optical image, and here
the peak wavelength is a wavelength for which a light intensity is the maximum in the wavelength band forming the optical images.

10. The information acquisition apparatus according to claim 1, wherein the image pickup element is an image pickup element which acquires a monochrome image, not having a color filter.

* * * * *